(12) United States Patent
Uppal et al.

(10) Patent No.: US 10,533,617 B2
(45) Date of Patent: Jan. 14, 2020

(54) STRUT-TYPE SELECTABLE CLUTCH WITH HYDRAULIC DEPLOYMENT PREVENTION FEATURES

(71) Applicant: Magna Powertrain Inc., Concord (CA)

(72) Inventors: Ranjit Uppal, Brampton (CA); Sean Steele, Mississauga (CA); Alberto Passos, Mississauga (CA); Dusan Milacic, North York (CA)

(73) Assignee: MAGNA POWERTRAIN INC., Concord (CA)

( * ) Notice: Subject to any disclaimer, the term of this patent is extended or adjusted under 35 U.S.C. 154(b) by 151 days.

(21) Appl. No.: 15/683,086

(22) Filed: Aug. 22, 2017

(65) Prior Publication Data

US 2018/0058518 A1 Mar. 1, 2018

Related U.S. Application Data

(60) Provisional application No. 62/382,337, filed on Sep. 1, 2016, provisional application No. 62/410,426, filed on Oct. 20, 2016.

(51) Int. Cl.

| F16D 41/12 | (2006.01) |
| F16D 41/14 | (2006.01) |
| F16D 27/00 | (2006.01) |
| F16D 25/12 | (2006.01) |
| F16D 27/102 | (2006.01) |
| F16D 41/06 | (2006.01) |
| F16D 41/08 | (2006.01) |

(52) U.S. Cl.
CPC ............. *F16D 41/12* (2013.01); *F16D 25/12* (2013.01); *F16D 27/102* (2013.01); *F16D 41/084* (2013.01); *F16D 2041/0603* (2013.01)

(58) Field of Classification Search
None
See application file for complete search history.

(56) References Cited

U.S. PATENT DOCUMENTS

| 3,899,060 A * | 8/1975 | Clements ................ F16D 23/10 |
| | | 192/69.3 |
| 6,116,394 A * | 9/2000 | Ruth ...................... F16D 41/125 |
| | | 192/46 |
| 6,186,299 B1 * | 2/2001 | Ruth ....................... F16D 41/12 |
| | | 192/113.32 |
| 9,181,993 B1 | 11/2015 | Swales et al. |
| 2006/0185957 A1 * | 8/2006 | Kimes ..................... F16D 41/12 |
| | | 192/46 |
| 2012/0149518 A1 | 6/2012 | Kimes |
| 2013/0256078 A1 | 10/2013 | Kimes et al. |
| 2014/0284167 A1 | 9/2014 | Kimes |
| 2014/0305761 A1 | 10/2014 | Kimes |
| 2015/0204391 A1 | 7/2015 | Kimes |
| 2015/0204392 A1 | 7/2015 | Kimes |
| 2015/0354407 A1 * | 12/2015 | Anglin .................... F01D 25/18 |
| | | 188/82.77 |
| 2016/0160941 A1 | 6/2016 | Green et al. |

(Continued)

FOREIGN PATENT DOCUMENTS

WO WO2012078203 A1 6/2012

*Primary Examiner* — Mark A Manley
(74) *Attorney, Agent, or Firm* — Dickinson Wright PLLC

(57) ABSTRACT

A one-way clutch having an anti-deployment feature operable to counteract hydraulic forces acting on the strut so as to assist in maintaining the strut in a non-deployed position.

17 Claims, 13 Drawing Sheets

(56) References Cited

U.S. PATENT DOCUMENTS

| | | |
|---|---|---|
| 2016/0201738 A1 | 7/2016 | Kimes |
| 2016/0201739 A1 | 7/2016 | Kimes |
| 2016/0201740 A1 | 7/2016 | Kimes |
| 2017/0204917 A1 | 7/2017 | Bird et al. |

\* cited by examiner

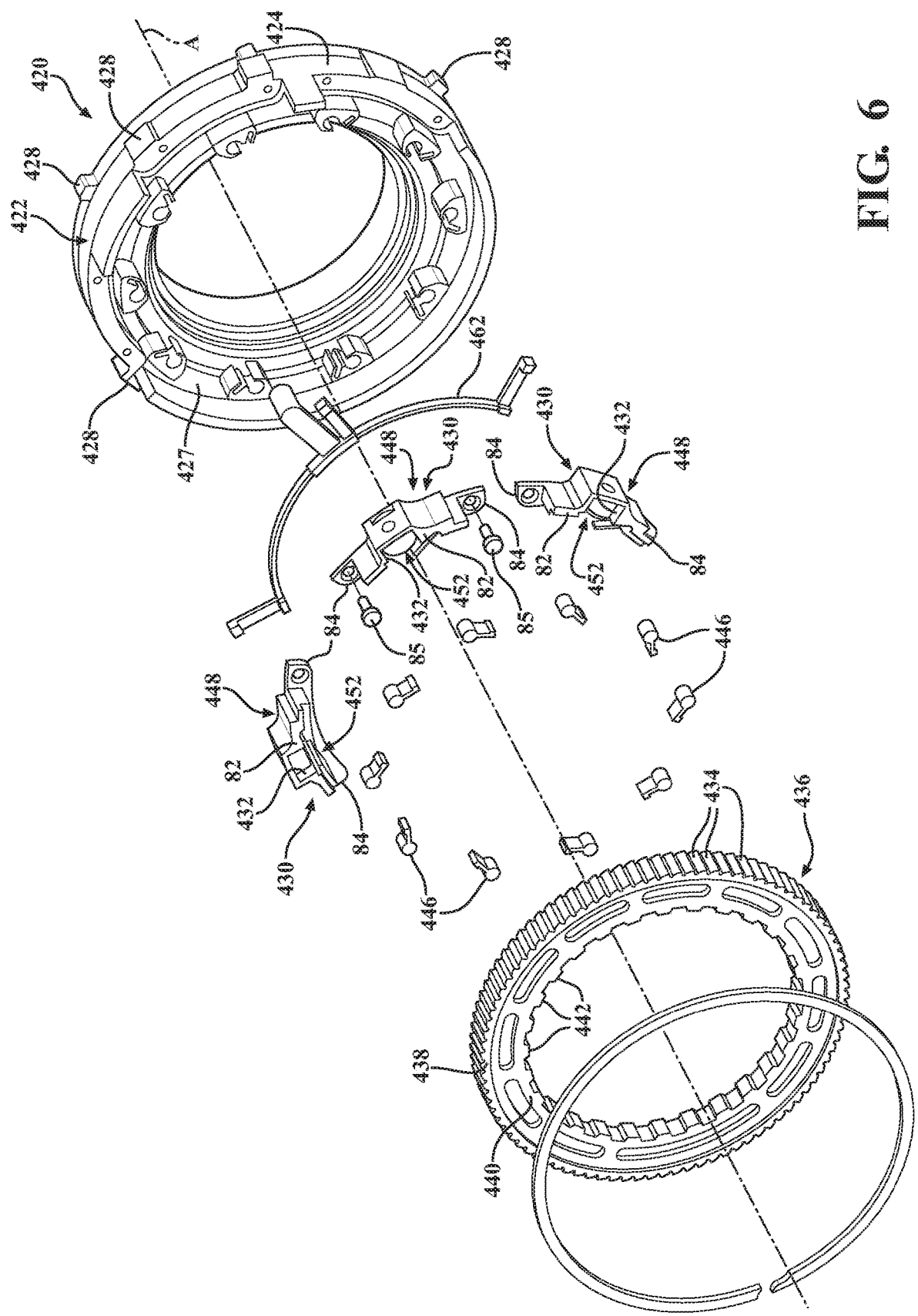

STRUT-TYPE SELECTABLE CLUTCH WITH HYDRAULIC DEPLOYMENT PREVENTION FEATURES

CROSS-REFERENCE TO RELATED APPLICATIONS

This application claims the benefit of U.S. Provisional Application No. 62/382,337 filed on Sep. 1, 2016 and U.S. Provisional Application No. 62/410,426 filed on Oct. 20, 2016. The entire disclosures of each of the above applications are incorporated herein by reference.

FIELD OF THE INVENTION

The present disclosure is generally related to overrunning coupling devices such as one-way clutches or brakes and, more specifically to selectable one-way coupling (SOWC) devices and/or electronically-controlled one way coupling (EOWC) devices having a deployable strut and an arrangement for inhibiting unintended deployment of the strut.

BACKGROUND OF THE INVENTION

This section provides background information related to the present disclosure which is not necessarily prior art.

Automatic transmissions provide a plurality of forward and reverse speed or gear ratios by selectively actuating one or more clutches and/or brakes to establish a torque-transmitting drive connection between a transmission input and a transmission output for supplying motive power (i.e., drive torque) from a powertrain to a driveline in a motor vehicle. One type of brake or clutch widely used in automatic transmission is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Typically, a locking member, such as a strut, associated with the one-way clutch is moveable between a non-deployed position to establish a freewheeling mode and a deployed position to establish a locked mode. The strut is commonly biased toward one of its two positions. Such conventional one-way clutches provide no independent control over their modes of operation, that is to say whether they lockup or freewheel in both directions and are commonly referred to as passive one-way clutches. Thus, basic one-way clutches provide the "locked" mode in one rotary direction and the "freewheel" mode in the opposite direction based on the direction that the drive torque is being applied to the input race or drive plate.

There are however, requirements in modern automatic transmissions where a "controllable" overrunning coupling device, commonly referred to as either a selectable one-way clutch (SOWC) or an electrically-controlled one-way clutch (EOWC), can be selectively controlled to provide additional functional modes of operation. Specifically, a controllable one-way clutch may further be capable of providing a freewheel mode in both rotary directions until a command signal (i.e., from the transmission controller) causes a power-operated actuator to shift the coupling device into its lockup mode. Thus, a controllable one-way clutch may be capable of providing a drive connection between an input member and an output member in one or both rotational directions and it may also be operable to freewheel in one or both directions. It is also known in modern automatic transmissions to integrate a passive one-way clutch and a controllable one-way clutch into a combined coupling device, commonly referred to as a bi-directional clutch.

During development testing of controllable one-way clutches at least one issue was identified that needed to be addressed. Specifically, under certain operating conditions of the automatic transmission, excessive oil levels are generated in the controllable one-way clutches in the vicinity of the deployable struts which can potentially result in unintended "hydraulic deployment" of the strut. Unintended hydraulic deployment is a condition where the strut is moved from its non-deployed position to its deployed position, independent of actuation of the power-operated actuator, due to a pressure gradient acting thereon. This pressure gradient, in combination with fluid dynamics associated with fluid flow around the clutch components, results in a force vector acting on an end portion of the strut. As this hydraulic force acting on the end portion of the strut increases in magnitude, it eventually overcomes the biasing force exerted on the strut by the strut return spring, thereby resulting in unintended partial or full deployment of the strut. Such unintended hydraulic deployment may cause the strut to "ratchet" against the inner race/drive plate which results in premature fatigue failure of the strut system and/or the armature associated with the power-operated actuator. Also, the impact may cause the armature/strut configuration to be deformed so as to result in loss of the primary latching function as the strut may only have partial deployment capabilities.

Accordingly, a need exists to continue development of new and improved overrunning coupling devices that advance the art and provide enhanced functionality.

SUMMARY OF THE INVENTION

This section provides a general summary of the disclosure and is not intended to be considered a comprehensive listing of all of its aspects, features and objectives.

In one aspect of the present disclosure, a one-way clutch assembly is provided that is adapted for use in a power transmission device.

It is another aspect of the present disclosure to configure the one-way clutch assembly to include a clutch module having a first component and a second component arranged for rotation relative to the first component, and a strut module having at least one strut pivotably mounted to the first component for movement relative to ratchet teeth formed on the second component between a non-deployed/unlocked position and a deployed/locked position.

As a related aspect, the one-way clutch assembly is configured to include an anti-deployment feature in association with at least one of the first component and the strut and which is capable of inhibiting unintended movement of the strut toward its deployed/locked position in response to hydraulic fluid forces and/or fluid dynamics acting on the one-way clutch assembly within the power transmission device.

In accordance with one embodiment, a first anti-deployment feature is directed to providing an elongated flow channel in the first component which functions to direct fluid away from the strut in response to rotation of the second component relative to the first component within the power transmission device.

In accordance with another embodiment, a second anti-deployment feature is directed to providing a cammed surface on the first component which is configured to direct fluid to assist in maintaining the strut in its non-deployed/ unlocked position in response to rotation of the second component relative to the first component within the power transmission device.

In accordance with still another embodiment, a third anti-deployment feature is directed to providing one or more flow channels or "spoilers" in the strut which are configured to direct fluid to assist in maintaining the strut in its non-deployed/unlocked position in response to rotation of the second component relative to the first component within the power transmission device.

In accordance with a further embodiment, a fourth anti-deployment feature is directed to providing one or more elongated flow channels on the cammed surface of the first component which are aligned with one or more corresponding flow channels or "spoilers" provided in the strut which cooperate to direct fluid and to assist in maintaining the strut in its non-deployed/unlocked position in response to rotation of the second component relative to the first component within the power transmission device. The flow channel(s) associated with the cammed surface of the first component are configured to direct fluid flow into the corresponding flow channel(s) formed in the strut so as to apply a fluid-generated biasing force on the strut for urging the strut toward its non-deployed/unlocked position.

One or more of these anti-deployment features can be applied to a passively-controlled one-way clutch assembly, an actively-controlled one-way clutch assembly, or a combination thereof configured as a bi-directional one-way clutch assembly.

Further areas of applicability of the inventive concepts will become more apparent from the detailed description provided herein. The aspects and embodiments listed in this summary are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 6 is an exploded isometric view of a bi-directional clutch assembly configured to include a modular active strut arrangement for a selectable one-way clutch in accordance with another aspect of the present disclosure;

DESCRIPTION OF THE ENABLING EMBODIMENTS

Example embodiments will now be described more fully with reference to the accompanying drawings. In general, each embodiment is directed to a overrunning coupling device (i.e. brake and/or clutch) having at least a controllable one-way locking device including a moveable locking component (i.e. sprag, strut, etc.) that is controlled, at least in part, via an electromagnetic actuator. Thus, the one-way locking device transmits torque mechanically but is actuated via an electrical actuation system. However, the example embodiments only are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
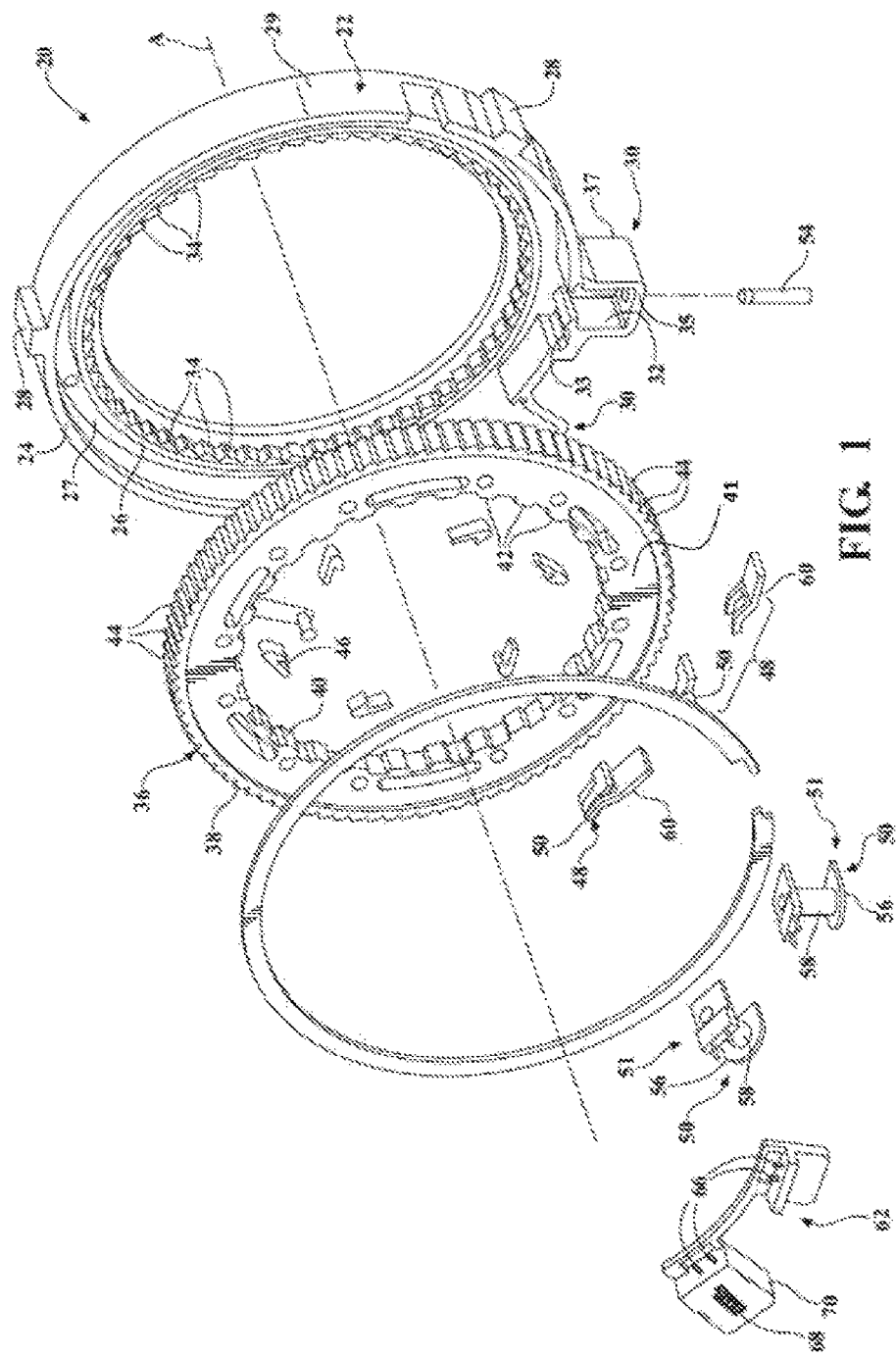
FIG. 1 is an exploded isometric view of a bi-directional clutch assembly configured to include a passive one-way clutch and a controllable one-way clutch having an electromechanical actuator and a lead frame and integrated safety switch in accordance with an aspect of the disclosure.
Figure 2:
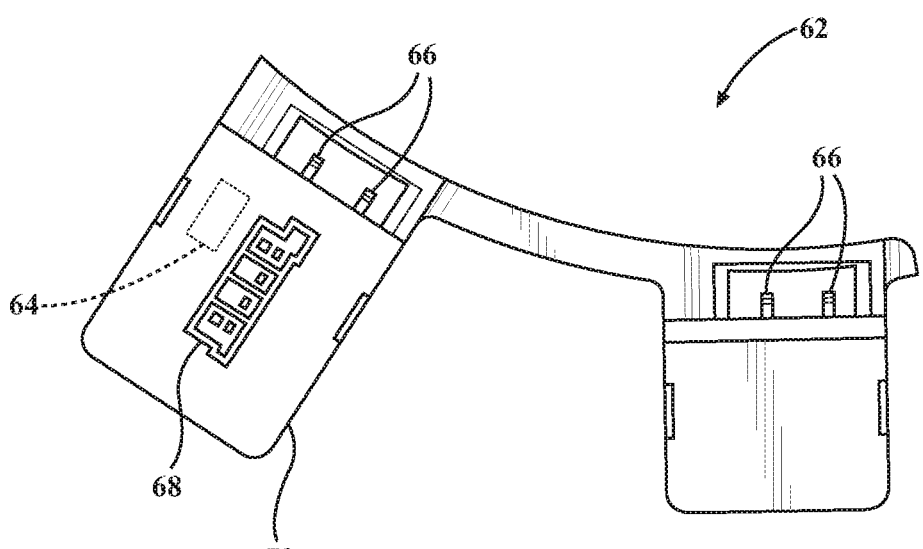
FIG. 2 is a front view of the lead frame and integrated safety switch of FIG. 1.
Figure 3:
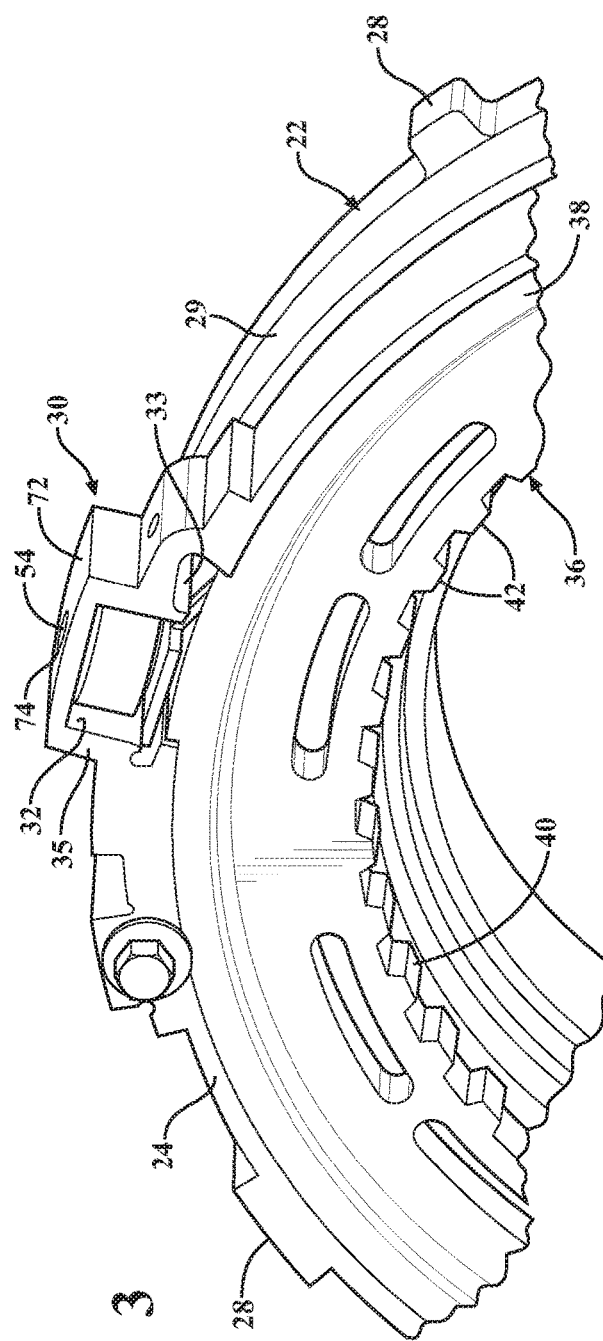
FIG. 3 is an assembled partial isometric view of the clutch assembly shown in FIG. 1.

Referring to FIGS. 1-3, wherein like numerals indicate corresponding parts throughout the several views, a bi-directional clutch assembly 20 is generally shown. As will be detailed, bi-directional clutch assembly 20 generally includes a clutch module have a stationary outer race and a rotatable inner race, a passive one-way clutch having a plurality of passive struts, and a controllable one-way clutch having at least one active strut assembly and an electromagnetic actuator. The clutch module of the clutch assembly 20 includes an outer race 22 that extends annularly about an axis A. The outer race 22 includes an outer ring segment 24 and an inner ring segment 26 that are spaced radially from one another and interconnected via a radial web segment 27. The outer ring segment 24 presents a plurality of outer lugs 28 that extend radially outwardly from the outer surface 29 for mating with a first component. The first component can be a stationary component (such as a housing of a transmission) or a rotary component (such as a shaft). The outer ring segment 24 further presents at least one protrusion 30 that extend radially outwardly from the outer surface 29. Each of the protrusions 30 defines a radially extending actuator pocket 32 and a strut pocket 33. It should be appreciated that more or fewer protrusions 30 could be utilized. The inner ring segment 26 presents a plurality of inner ramp surfaces, hereinafter referred to as inner ratchet teeth 34, that extend radially inwardly and are evenly distributed about the axis A.

The clutch module of the clutch assembly 20 further includes an inner race 36 that also extends annularly about the axis A. The inner race 36 has an outer rim 38 and an inner rim 40 that are spaced radially from one another by a radial web segment 41. The outer rim 38 is disposed radially between the outer and inner ring segments 24, 26 of the outer race 22, and the inner rim 40 is disposed radially inwardly from the inner ring segment 26 of the outer race 22. The inner rim 40 of the inner race 36 presents a plurality of inner lugs 42 that extend radially inwardly for mating with a second component (typically a rotary component). Commonly, lugs 42 interconnect a shaft or clutch plates for rotation with inner race 36. Further, the outer rim 38 of the inner race 36 presents a plurality of outer ramp surfaces, hereinafter referred to as outer ratchet teeth 44, that extend radially outwardly and are evenly distributed about the axis A.

The passive one-way clutch includes a plurality of locking elements, also referred to as passive struts 46, which are pivotally supported in strut apertures formed in the inner race 36 for pivoting between a locking position and an unlocking position. In the locking position, the passive struts 46 engage the inner ratchet teeth 34 of the outer race 22 for connecting the outer and inner races 22, 36 to one another during counter-clockwise rotation of the inner race 36 relative to the outer race 22. Therefore, engagement by one or more of the passive struts 46 prevents relative displacement of the outer and inner races 22, 36 in the counter-clockwise direction. However, the passive struts 46 still allow relative displacement, i.e., overrun, in the clockwise direction when located in the locked position since they ratchet over the ramped profile of the inner ratchet teeth 34. In the unlocking position, the passive struts 46 are radially spaced from the inner ratchet teeth 34 of the outer race 22, therefore also allowing counter-clockwise rotation of the inner race 36 relative to the outer race 22.

In association with the controllable one-way clutch, an active strut assembly 48 is received by each of the strut pockets 33 of the outer ring segment 24. Each of the active strut assemblies 48 includes an active strut 50 that is selectively pivotal between a locked (deployed) and an unlocked (non-deployed) position. In the locked position, the active strut 50 lockingly engages the outer ratchet teeth 44 of the inner race 36, thereby locking the outer and inner races 22, 36 to one another during clockwise movement of the inner race 22 relative to the outer race 22. However, the active strut 50 still allows relative displacement, i.e., overrun, in the counter-clockwise direction. In the unlocked position, the active strut 50 is radially spaced from the outer ratchet teeth 44, thereby allowing the inner and outer races 22, 36 to rotate relative to one another. Furthermore, each of the active strut assemblies 48 includes an armature 60 that is disposed adjacent to, and in operable association with, the active strut 50 for providing the pivotal movement of the active strut 50.

The selectable one-way clutch also includes electromagnetic actuators 51, each including a coil assembly 52 mounted in the actuator pocket 32 and radially spaced from the active strut 50 and armature 60. The coil assembly 52 includes a core 54 of a magnetically permeable material, a bobbin 56 disposed about the core 54, and a coil 58 wrapped about the bobbin 56. Furthermore, the armature 60 is disposed between the active strut 50 and the coil 58 for pivoting toward the core 54 and thus providing the pivotal movement of the active strut 50 in response to energization of the coil 58. Armature 60 can be made of a magnetic material so as to be magnetically attracted to core upon energization of coil 58 or made of a non-magnetic material so as to be mechanically-coupled to a moveable component (solenoid) in alternative actuators 51.

In a preferred but non-limiting arrangement, when voltage and/or current are applied to the coil 58, the coil 58 becomes an electromagnet producing an electric field (or flux). The flux flows outwards in all directions and transfers through the small air gap between the armature 60 and core 54 in the center of the coil assembly 52. The core 54 becomes magnetized, therefore attracting the armature 60 towards the core 54. The resulting motion forces the active strut 50 to mechanically deploy due to the linkage between the active strut 50 and the armature 60. On deployment, the active strut 50 moves from its unlocked position (FIG. 3B) to its locked position (FIG. 3A) where it locates itself against one of the outer ratchet teeth 44 of the inner race 36, effectively locking the inner race 36 from rotating in that direction. Disengagement occurs as voltage and/or current is removed from the coil assembly 52, wherein the armature 60 is demagnetized and free from magnetic attraction to the core 54 of the coil assembly 52. A biasing member, such as a strut return spring 61, is positioned within strut pocket 33 between the active strut 50 and the outer race 22, causing the active strut 50 to move back to its unlocked position upon de-energization of the coil assembly 52 and the demagnification of the core 54.

It should be appreciated that the arrangement of the armature 60, active strut 50, and coil assembly 52 can act to apply a locking force in a radial direction (as shown in FIG. 1) or an axial direction, depending on the layout and/or requirements of the clutch assembly 20. Radial stacked clutch assembly 20 designs offer packaging advantages over their axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

A lead frame 62 is attached to each of the electromagnetic actuators 51 for electrically connecting the coils 58 to one another for energizing the coils 58. It should be appreciated that the lead frame 62 could connect any number of coils 58. A printed circuit board (PCB) 64 is attached to the lead frame 62 for selectively controlling the energization of the coils 58. The circuit board 64 is disposed radially and axially adjacent to one of the coils 58. The lead frame 62 further includes at least one power output contact 66 that is disposed radially and axially adjacent to each of the coils 58 for electrically connecting to the coils 58 to provide power to the coils 58. Any number of power contacts 66 could be utilized to power any number of coils 58. A resistance welded connection is utilized to connect the power output contact 66 and the coils 58, however, other connections could alternatively be utilized. Furthermore, at least one wire (not shown) extends between the circuit board 64 and each of the power output contacts 66 for electrically connecting the circuit board 64 and the power output contacts 66. The lead frame 62 also includes a wire harness 68 that extends from the circuit board 64 for connecting to a transmission control module (TCM) or a powertrain control module (PCM) for transmitting data to the circuit board 64 and to power the circuit board 64. Additionally, the lead frame 62 includes a plastic encapsulation or casing 70 that is disposed about the circuit board 64 and the wires for protecting the circuit board 64 and the wires for allowing the lead frame 62 to be submerged in Automatic Transmission Fluid and operate in −40 C to +140 C temperatures. It should be appreciated that the aforementioned configuration of the lead frame 62 and associated components provide a low-cost, modular solution that provides for a more simplified manufacturing process.

The applied voltage to the coils 58 is comprised of a High Side and Low Side and is supplied by the TCM or the PCM of a vehicle. The High Side (HS) is typically a shared power supply with other loads, and the Low Side is typically a discrete channel (LSD) that controls the discrete/individual circuit. The LSD is capable of controlling the amount of current across the coils 58. Since the LSD is typically located in the TCM/PCM, there is a requirement to have a wire harness between the electromagnetic actuators 51 and the TCM/PCM. If the wire harness suffers mechanical damage and the electromagnetic actuators 51 discrete LSD channel is "short circuited-to chassis ground", the coils may become energized. Accordingly, an Integrated High Side Fail Safe Switch (HSFSS) is provided to add another level of logic in order to control the shared High Side supply. The HSFSS is comprised of the Printed Circuit Board 64 (PCB), a High Side Switch (not shown), a transistor (not shown), and passive components (not shown). They are electrically connected to the lead frame 62. It should be appreciated that the configuration of the lead frame 62 protects the integrated electronic components (including the HSFSS), and provides improved packaging and reduced wiring. Furthermore, it should be appreciated that the modular configuration of the lead frame 62 and associate components could be utilized on other clutch assembly configurations, e.g., axially engaging clutch assemblies. The HSFSS is controlled by the OWCC HS ENABLE, which enables the HSFSS to pass current to the coils 58. FIG. 3 illustrates an exemplary embodiment of a circuit that could be utilized with the printed circuit board 64 according to an aspect of the disclosure.

Figure 3B:
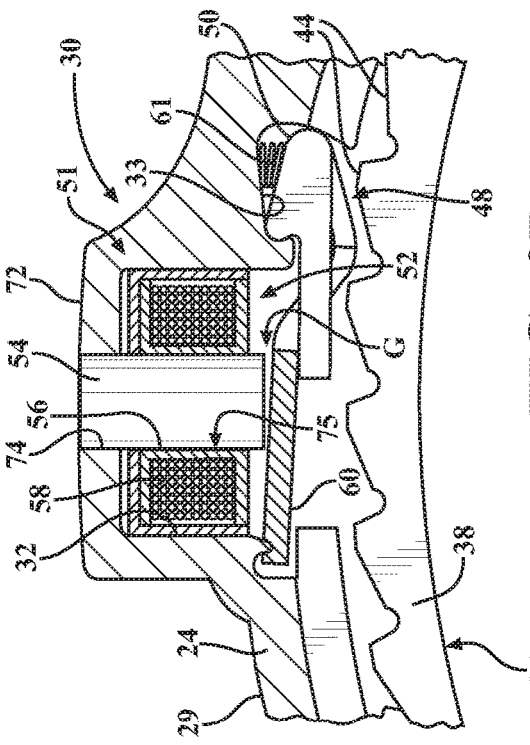
FIGS. 3A and 3B are sectional views of the electromagnetic actuator of FIG. 3 with a strut of an active strut assembly shown in locked (i.e. deployed) and unlocked (i.e. non-deployed) positions, respectively, in response to respective energized and de-energized states of the electromagnetic actuator.
Figure 3A:
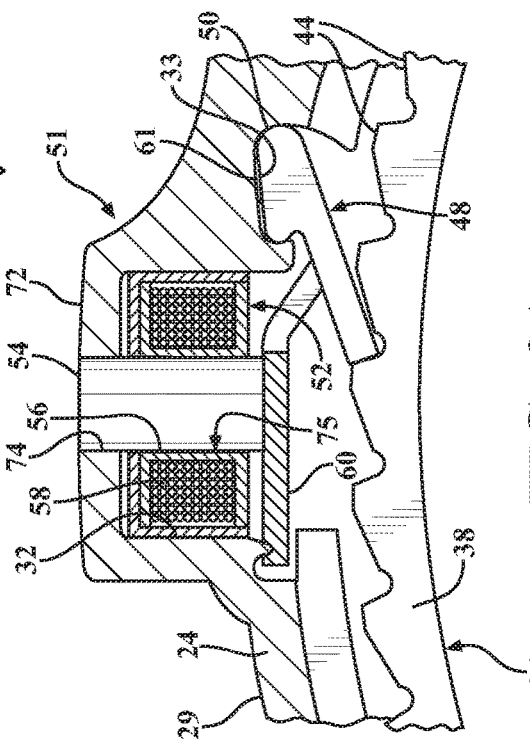

Referring to FIGS. 3, 3A and 3B, in an example embodiment of the protrusions 30, the open side surface 35 defines the actuator pocket 32 for axially receiving the coil assembly 52. Furthermore, a radially outwardly facing outer wall 72 of the protrusion 30 provides a through passage, also referred to simply as orifice 74, that extends radially inwardly into the actuator pocket 32. In this embodiment, coil 58 and bobbin 56 are axially disposed and press fit into the actuator pocket 32 through the open side surface 35. Once in position in the actuator pocket 32, which extends radially inwardly from the outer wall 72, the core 54 is pressed radially inwardly through the orifice 74 and through a central through passage of the bobbin 56 until it reaches a predetermined, preset location which sets the magnetic gap G between an armature 60 and the free end of the core 54. The core 54 attains a press fit against an inner surface 75 that defines and bounds the through passage of the bobbin 56, thereby being fixed against movement therein. The core 54 can further be press fit in the through passage of the bobbin 56, or configured in a clearance fit therein. FIG. 3A shows an active strut 50 in the locked position as a result of energization of the coil assembly 52 and FIG. 3B shows the active strut 50 in the unlocked position as a result of de-energizing the coil assembly 52.

Figure 4A:
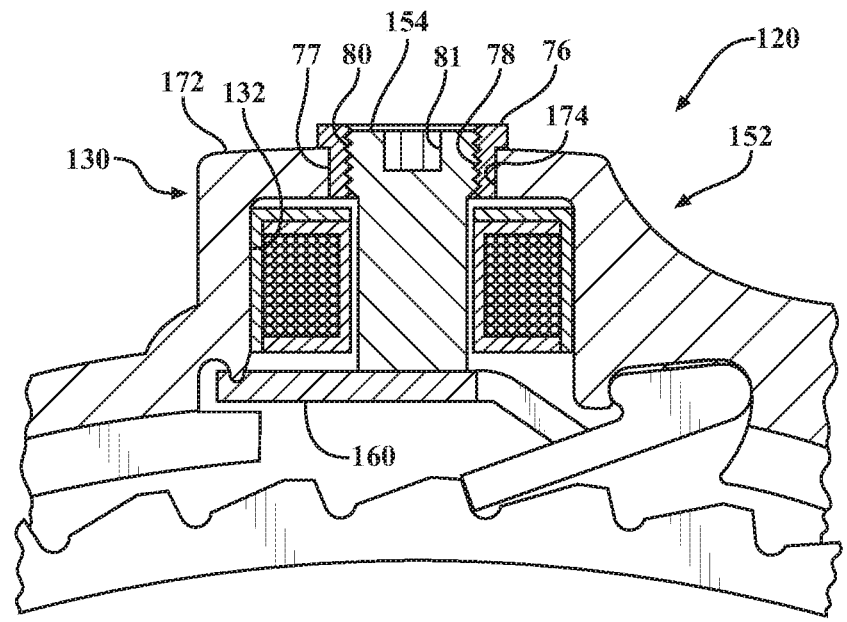
FIGS. 4A and 4B are similar views to FIGS. 3A and 3B and show an alternative embodiment of an electromagnetic actuator constructed in accordance with another aspect of the present disclosure.
Figure 4B:
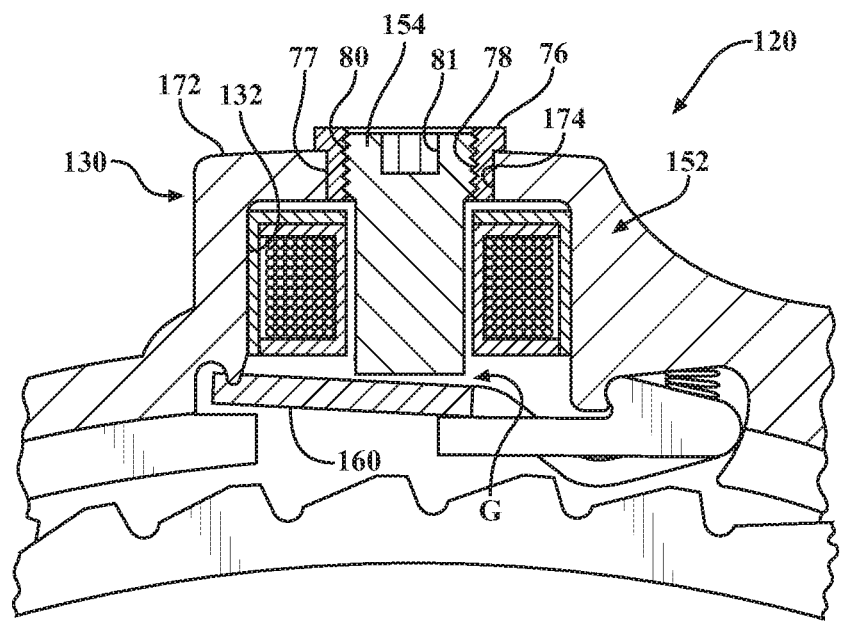

Referring to FIGS. 4A-4B, another example embodiment of a portion of a clutch assembly 120, similar to that discussed above with regard to FIGS. 3, 3A and 3B, is shown, wherein the same reference numerals, offset by a factor of 100, are used to identify like features. The coil assembly 152 is axially disposed and press fit into the respective actuator pockets 132, as discussed above; however, rather than directly fixing and press fitting the core 154 into an orifice 174 in an outer wall 172 of the protrusion 130, the core 154 is operably fixed in the orifice 174 in the outer wall 172 via a hollow adaptor plug, also referred to as nut 76. The nut 76 is first fixed in the orifice 174 of the protrusion, and then, the core 154 is disposed through the nut 76 and fixed thereto, whereupon the core 154 is readily adjusted to provide the desired gap G between the free end of the core 154 and the armature 160. The nut 76 is provided having an outer surface 77 configured for fixation within the orifice 174, such as via at least one of press fit, bonding agent, weld joint, threaded engagement, or other suitable mechanical and/or adhesion fixation mechanism. The nut 76 further includes a threaded through passage 78 configured for threaded engagement with an externally threaded portion 80 of the core 154, shown as a threaded fastener end portion 80. To facilitate threading the core 154 into the nut 76, the fastener end portion 80 can be provided with a tool receptacle pocket 81, wherein the pocket 81 can be configured for engagement with any standard tool drive feature, as is known in the art of fasteners. When threading the core 154 into engagement with the nut 76, the gap G between the free end of the core 154 and the armature 160 can be precisely set, as desired, such as by threading the free end of the core 154 into abutment with the armature 160, and then reverse threading and backing the core 154 radially away from the armature 160 a set distance, which can be readily derived by knowing the pitch angle of the threads on the nut 76 and core 154, by way of example and without limitation. Upon fixing the core 154 in position, the core 154 can remain free from direct attachment with the coil 158 and bobbin 156, and thus, is disposed in a clearance fit therewith, which in turn allows for readily simple adjustment and replacement of the core 154 as desired without effect on either the coil 158 or bobbin 156.

Figure 5:
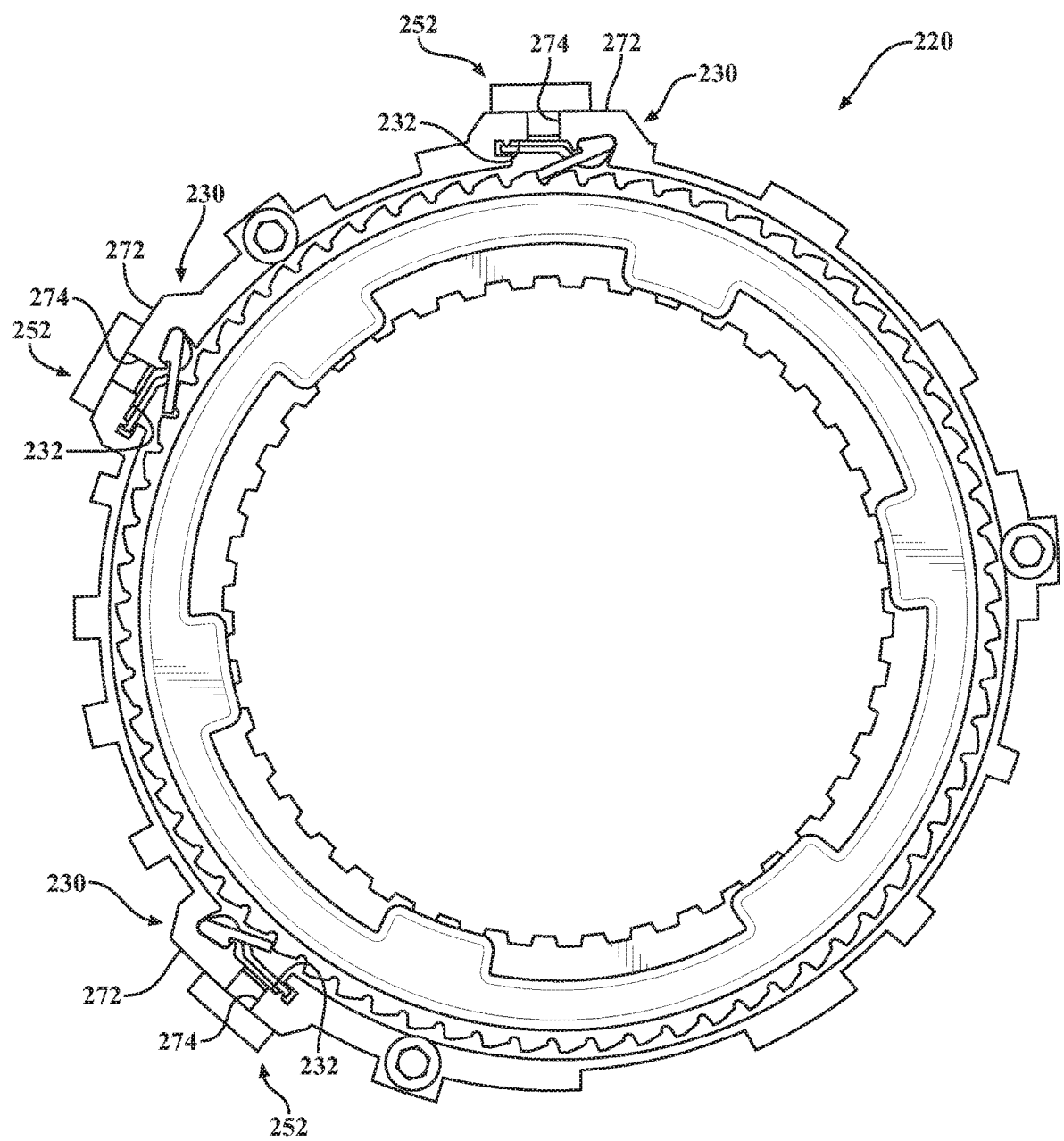
FIG. 5 illustrates a clutch assembly having a selectable one-way clutch with a press-fit electromagnetic actuator associated with an active strut assembly in accordance with another aspect of the present disclosure.
Figure 5A:
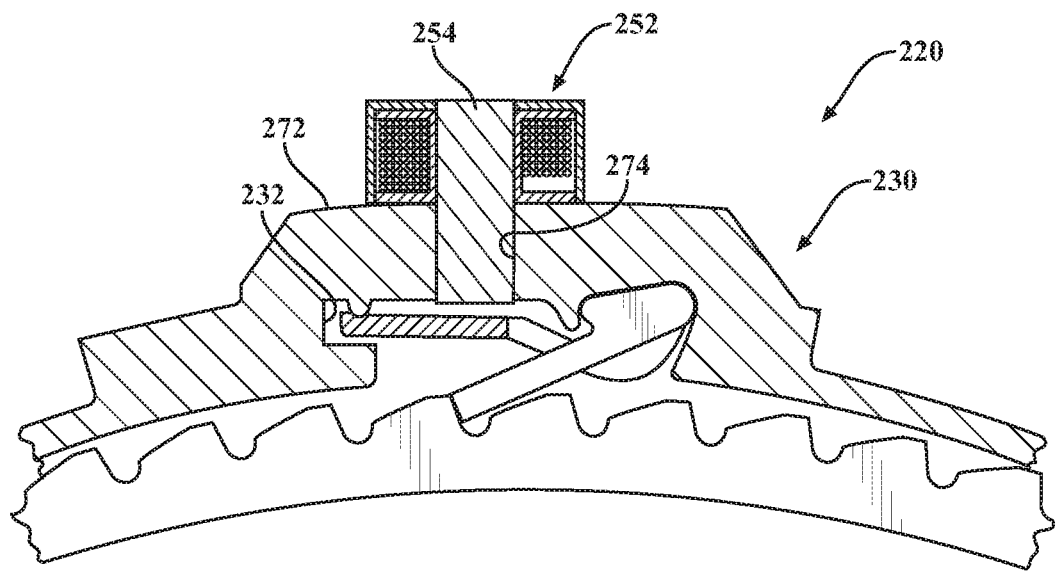
FIG. 5A is an enlarged partial sectional view of FIG. 5 illustrating a radially pressed electromagnetic actuator in accordance with one aspect of the present disclosure.
Figure 5B:
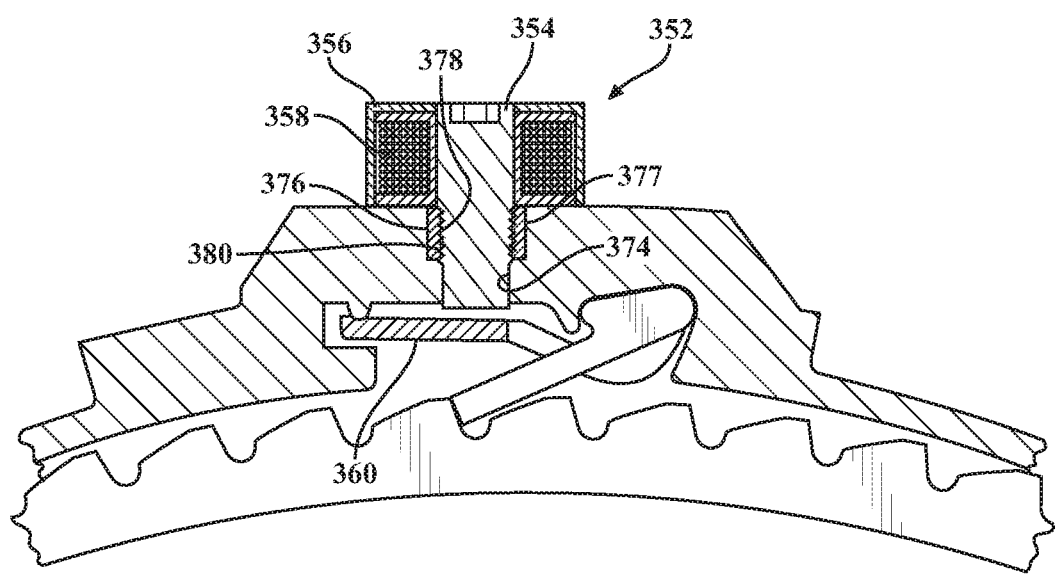
FIG. 5B is a view similar to FIG. 5A showing another version of a radially pressed electromagnetic actuator constructed in accordance with another aspect of the present disclosure.

Referring to FIGS. 5 and 5A, another example embodiment of a clutch assembly 220 is shown, wherein the same reference numerals, offset by a factor of 200, are used to identify like features. In this embodiment, an orifice 274 extends directly through the outer wall 272 of the protrusion 230 to the actuator pocket 232, wherein the orifice 274 is configured to receive the core 254 of the coil assembly 252 radially therein. The core 254 of the coil assembly 252 is pressed radially inwardly into the orifice 274 and fixed therein. As a result of the core 254 being fixed in the orifice 274, the entire coil assembly 252 is fixed in place without having access an inner portion of the protrusion 230. In the embodiment shown, the core 254 is sized for a press fit, also known as an interference fit, within the orifice 274, wherein it should be recognized that other mechanisms for fixing the core 254 in the orifice 274, other than press fit, are contemplated herein, such as discussed above with reference to adhesives, weld joints, mechanical fasteners and the like. Further, as shown in FIG. 5B, another example embodiment, similar to that discussed above with regard to FIGS. 4A and 4B, is shown, wherein the same reference numerals, offset by a factor of 300, are used to identify like features. Rather than fixing the core 354 in direct contact with the orifice 374 in the outer wall 372, a nut 376 can be used to facilitate fixing the core 354 of the coil assembly 352 in a precise setting relative to the armature 360, thereby establishing a precise gap G therebetween, as desired. The nut 376 is provided having an outer surface 377 configured for fixation within the orifice 374, such as via at least one of press fit, bonding agent, weld joint, threaded engagement, or other suitable mechanical and/or adhesion fixation mechanism. The nut 376 further includes a threaded through passage 378 configured for threaded engagement with an externally threaded portion 380 of the core 354, shown as a portion immediately adjacent the radially outwardly extending bobbin 356 and coil 358. When threading the core 354 into engagement with the nut 376, the gap G between the free end of the core 354 and the armature 360 can be precisely set, as discussed above with regard to FIGS. 4A and 4B. Upon fixing the core 354 within the nut 376, it is to be recognized that other than the core 354, the remaining portion of the coil assembly 352 remains external to the protrusion 312, and thus, can be freely accessed when desired, such that servicing the coil assembly 352 is made easy.

Figure 7:
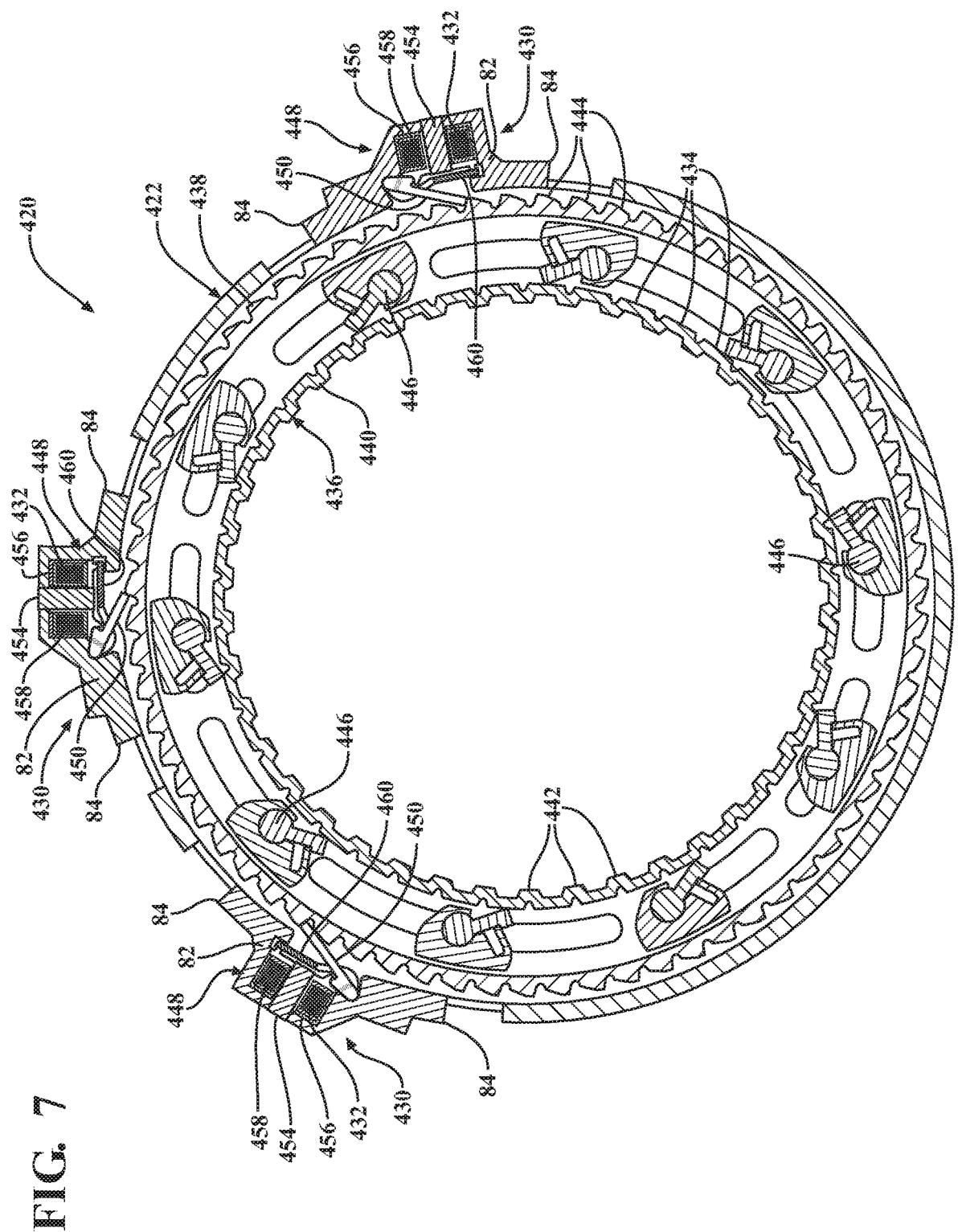
FIG. 7 is a sectional view of the bi-directional clutch assembly shown in FIG. 6.

Referring to FIGS. 6 and 7, wherein like numerals indicate corresponding parts throughout the several views, offset by a factor of 400, a clutch assembly 420 is generally shown. The clutch assembly 420 includes an outer race 422 that extends annularly about an axis A. The outer race 422 includes an outer ring 424 that presents a plurality of outer lugs 428 that extend radially outwardly for mating with a first component. The first component can be a stationary component (such as a housing of a transmission) or a rotary component (such as a shaft). The outer race 422 further has an axially facing web or face 427 that has an annular shape that extends radially inwardly from the outer ring 424. A plurality of passive struts 446 are pivotally connected to the axial face 427. A biasing spring (not shown) engages each of the passive struts 446 for biasing the passive struts 446 in a locked position toward an inner race 436.

The inner race 436 extends annularly about the axis A. The inner race 436 has an outside rim or band 438 and an inside rim or band 440 that are spaced radially from one another on opposing sides of the passive struts 446. The inside band 440 of the inner race 436 presents a plurality of inner lugs 442 that extend radially inwardly therefrom for mating with a second component (typically a rotary component). The inside band 440 of the inner race 436 further presents a plurality of passive teeth 434 that extend radially outwardly therefrom for being engaged by the passive struts 446 for locking the inner and outer races 436, 422 to one another in response to counter-clockwise rotation of the inner race 436 relative to the outer race 422. The outside band 438 of the inner race 436 presents a plurality of active teeth 444 that extend radially outwardly therefrom and are evenly distributed about the axis A.

A plurality of active strut assemblies 448 are axially connected to the outer race 422. Each of the active strut assemblies 448 includes a generally arc shaped protrusion 430, wherein the protrusion 430 is constructed as separate piece of material from the outer race 422. Each protrusion 430 includes a base 82 and a pair of circumferentially extending flanges 84 that extend from the base 82 on opposing sides of the base 82. A fastener 85, e.g., a bolt, extends axially through a through opening in each of the flanges 84 and is fastened to the outer race 422 for securing the active strut assemblies 448 to the outer race 422. The active strut assemblies 448 are arranged in circumferential alignment with one another about the axis A, as desired.

An actuator pocket 432 extends axially into the base 82 of each of the active strut assemblies 448. A coil assembly 452 is disposed in each of the actuator pockets 432. The coil assembly 452 includes a core 454 of a magnetically permeable material, a bobbin 456 configured for receipt about the core 454, and a coil 458 wrapped about the bobbin 456. It should be appreciated that the bobbins 456 and coils 458 of the coil assemblies 452 can advantageously be easily fitted into their respective pockets 432 for easy installation.

Each of the active strut assemblies 448 includes an active strut 450 that is selectively pivotal between a locked and an unlocked position, as discussed above. In the locked position, the active struts 450 engage the active teeth 444 of the inner race 436, therefore locking the outer and inner races 422, 436 to one another during clockwise movement of the inner race 436 relative to the outer race 422. However, the active struts 450 allow relative displacement, i.e., overrun, in the counter-clockwise direction. In the unlocked position, the active struts 450 are radially spaced from the active teeth 444, allowing the outer and inner races 422, 436 to rotate relative to one another.

The plurality of passive struts 446 are pivotal between a locking position and an unlocking position. In the locking position, the passive struts 446 engage the passive teeth 434 of the outer race 422 for connecting the outer and inner races 422, 436 to one another during counter-clockwise rotation of the inner race 436 relative to the outer race 422. Therefore, engagement by the passive struts 446 prevents relative displacement of the outer and inner races 422, 436 in the counter-clockwise direction, however, the passive struts 446 allow relative displacement, i.e., overrun, in the clockwise direction. In the unlocking position, the passive struts 446 are radially space from the passive teeth 434 of the outer race 422, thereby allowing counter-clockwise rotation of the inner race 436 relative to the outer race 422.

Each of the active strut assemblies 448 further includes an armature 460 disposed between the active strut 450 and the core 454 for providing the pivotal movement of the active strut 450 in response to energization of the coil 458. A lead frame 462, such as discussed above with regard to FIGS. 1 and 2, electrically connects the coils 458 to one another for energizing the coils 458 to actuate and pivot the active struts 450 to their engaged, locked positions.

Accordingly, it should be appreciated that the modular configuration of the active strut assemblies/coil assemblies 448, 452 allows the active strut assemblies/coil assemblies 448, 452 to be manufactured separately from the rest of the clutch assembly 420. Further, it should be appreciated that any number of the active strut assemblies/coil assemblies 448, 452 could be installed on any given clutch assembly 420 as needed to provide a needed amount of torque. Additionally, it should be appreciated that the modular active strut assemblies as described herein could be utilized on various other clutch assembly configurations.

It should be appreciated that being able to axially or radially load the coil assemblies 52, 152, 252, 352, 452 discussed above provides for a simple manufacturing assembly step and allows the coil assembly 52, 152, 252, 352, 452 to be assembled before being installed into the respective actuator pocket 32, 132, 232, 332, 432. It should further be appreciated that the aforementioned axially and radially loading pockets/protrusions could be utilized on other clutch assembly configurations.

Figure 8:
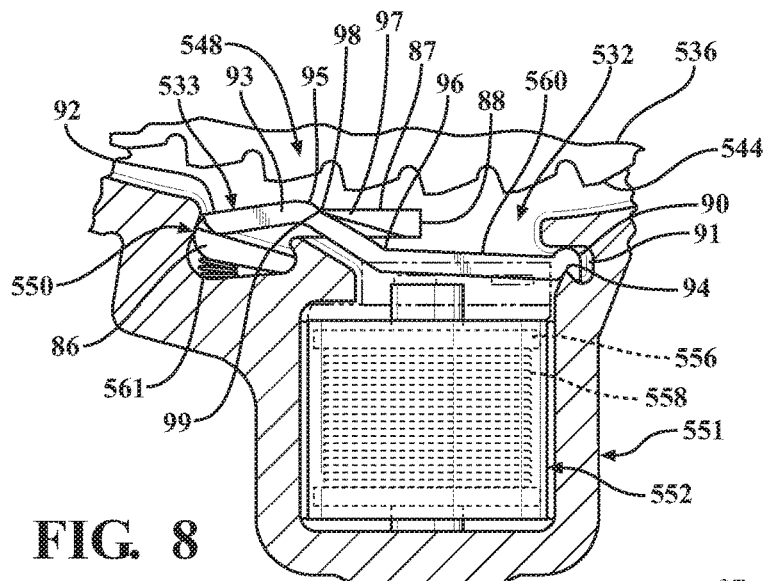
FIG. 8 is an enlarged partial side view of an active strut assembly adapted for use with the selectable one-way clutch associated with the bi-directional clutch assemblies of FIG. 1 and configured to provide a high inertia load resistance arrangement in accordance with the present disclosure and illustrating the active strut in an unlocked position when an electromagnetic actuator is non-energized.
Figure 9:
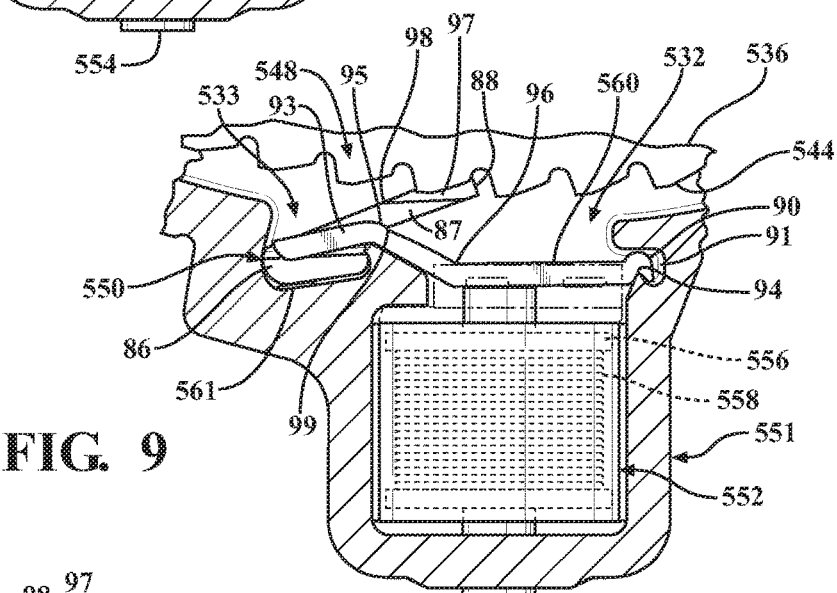
FIG. 9 is similar to FIG. 8 illustrating the active strut located in a locked position in response to energization of the electromagnetic actuator.
Figure 10:
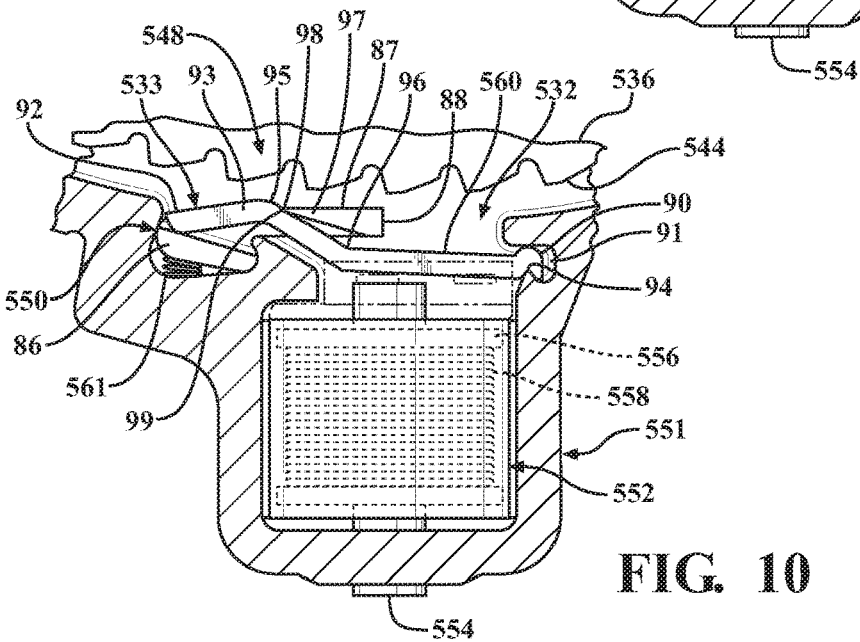
FIG. 10 is similar to FIG. 8 illustrating the inertia load resistance arrangement positively holding the active strut in its unlocked position upon application of a radially directed high inertial load.
Figure 11:
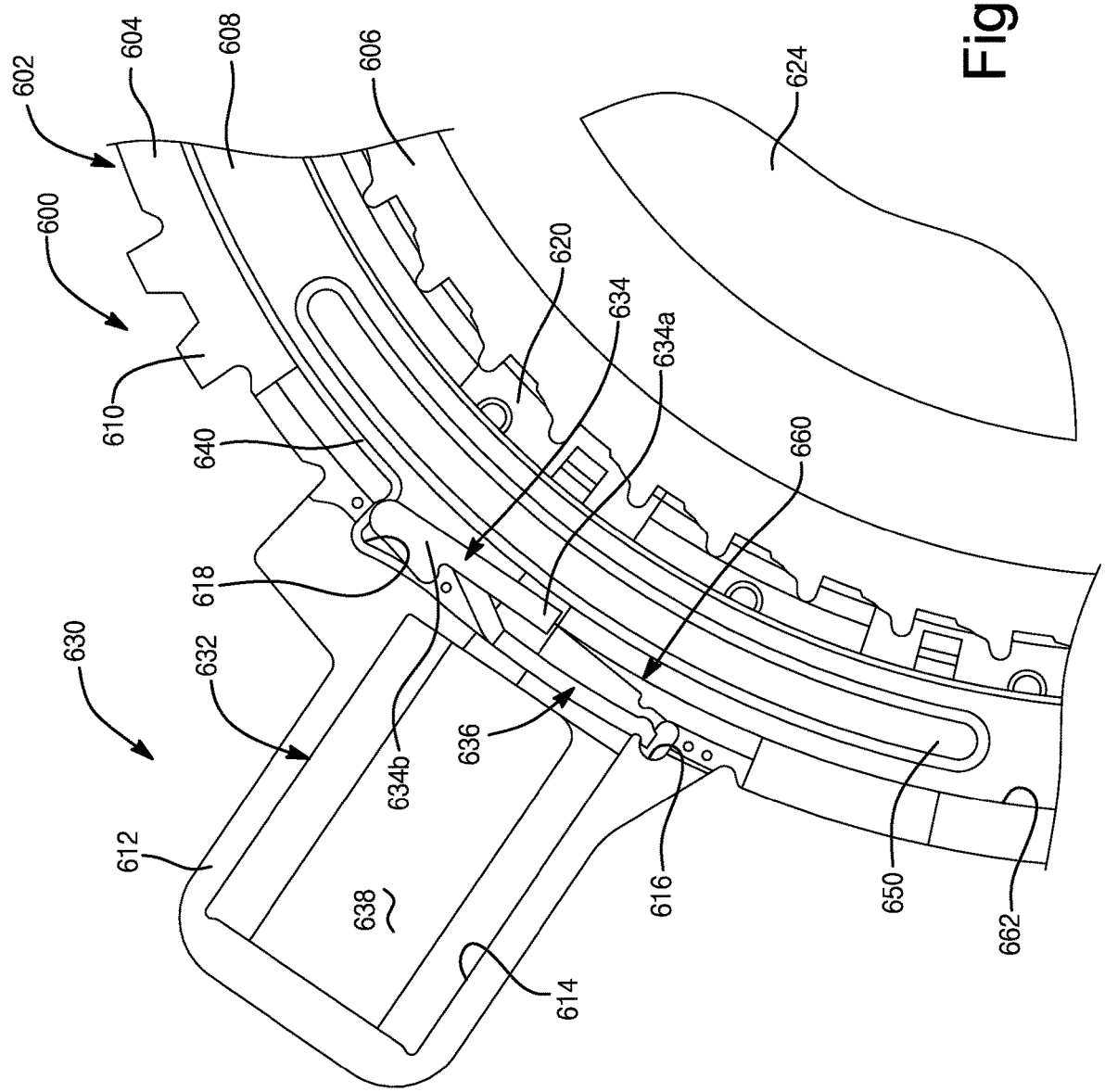
FIG. 11 is an enlarged partial view of an active strut assembly adapted for use with any of the controllable one-way clutches associated with any of the previously disclosed bi-directional clutch assemblies of the present disclosure and which is configured to provide one or more hydraulic deployment prevention features.

Referring to FIGS. 8-10, wherein like numerals indicate corresponding parts throughout the several views, offset by a factor of 500, an active strut assembly 548, which can be incorporated in any of the clutch assembly embodiments discussed herein, as well as others, as will be readily apparent to one skilled in the art, is received in a strut pocket 533 of the outer race 522. Each of the active strut assemblies 548 is operable via actuation of an electromagnetic actuator 551 having a coil assembly 552, an armature 560, a biasing spring 561, and an active strut 550.

The active strut 550 includes a base segment 86 and a locking arm 87. The locking arm 87 extends from the base segment 86 to a locking end or edge 88. The base segment 86 is pivotally disposed in the strut pocket 533 for pivoting movement between a locked position (FIG. 9) and an unlocked position (FIGS. 8 and 10). In the locked position, the locking edge 88 engages the outer ratchet teeth 544 of the inner race 536, and in the unlocked position, the locking edges 88 are radially spaced from the outer ratchet teeth 544 of the inner race 536. The biasing spring 561 is disposed in the strut pocket 533 and extends between the base segment 86 and a base or floor of the strut pocket 533 for biasing the strut 550 toward the unlocked position.

The coil assembly 552 includes a core 554 of a magnetically permeable material that is disposed through a central passage of a bobbin 556, with at least one coil 558 being wrapped directly onto the bobbin 556, and thus, operably about the core 554 for focusing the magnetic flux produced by the coil 558 about the core 554.

The armature 560 extends between a first end 90 that is seated in an armature section 91 of the actuator pocket 532 for pivotal movement therein and a second end 92 that extends into the strut pocket 533 into engagement with the base 86 of the strut 550. The armature 560 is shown as having bifurcated legs 93 forming a channel therebetween, wherein the channel is sized for clearance receipt of a reduced width section of the strut 550 therein, with each leg 93 extends along opposite sides of the strut 550. The first end 90 of the armature 560 is pivotally disposed about a pivot rail 94 in the armature section 91 of the pocket 532 for pivoting radially toward and away from the core 554, in response to energization of the coil 558, between an actuated position and a non-actuated position. In the actuated position, the armature 560 is drawn toward the core 554, whereupon the legs 93 drive the strut 550 into the locked position via engagement with the base segment 86. In the non-actuated position, the armature 560 is spaced from the core 554 and allows the biasing spring 561 to bias the strut 550 into the unlocked position. The armature 560 presents an upper bend 95 in each leg 92 and a lower bend 96 adjacent an attachment region of the legs 92, such that the upper and lower bends 95, 96 are between the first end 90 and the second end 92.

It is important, especially when the clutch assembly 520 is utilized on automotive components, for the struts 550 to only engage the outer ratchet teeth 544 of the inner race 536 when then coil assembly 552 is energized to intentionally move the struts 550 to the locked position. Therefore, resistance to inertia loading (high g-force in certain directions other than simple gravity) is important for the operation of the clutch assembly 520. The most common method of resisting high inertia loading is to utilize a higher force biasing spring 561. While this method is a quick fix, there are disadvantages associated therewith. One of the disadvantages is the increased resistance provided by the biasing spring 561 during normal operation, which requires the armature 560 and/or coil assembly 552 to be increased in size and thickness to produce the necessary increased magnetic forces to overcome the increase in spring force imparted by the larger spring 561. To accommodate such larger components, the pockets 532, 533 may also need to be larger, thereby increasing the overall size and weight of the clutch assembly 520.

As an alternative solution to increasing the size of the aforementioned components/assemblies, the generally central portion of the strut 550 that extends between the legs 93 of the armature 560 includes a projections 97 that have a generally triangular shaped cross-section that extends lengthwise along a portion of the locking arm 87, with the projections 97 extending outwardly from the central portion of the locking arm 87 away from one another into overlying relation with a respective leg 93. Each of the projections 97 converges and terminates at a generally sharp edge 98. Further, a shoulder 99 is defined by or provided adjacent the upper bend 95 in the legs 92 of the armature 560. The shoulders 99 are configured to be engaged by the edges 98 of the projections 97 of the strut 550 for restricting the strut 550 against movement toward the locked direction, unless otherwise actuated via energization of the coil assembly 552. Thus, during the application of inertial forces, the purposeful engagement of the projections 97 with the shoulders 99 causes the strut 550 to stop rotating upwardly, thereby preventing engagement of the outer ratchet teeth 544 of the inner race 536 with the locking edge 88 of the strut 550 (as best shown in FIG. 10).

FIG. 8 presents a non-energized position of the coil 558, with the strut 550 in the unlocked position. Further, FIG. 9 presents an energized position of the coil 558, causing the strut 550 to be pivoted to the locked position, as intended. FIG. 10 shows the situation in which a high inertial load is applied to the clutch assembly 520 in the radial inward direction (as shown by the arrow). In this situation the armature 560 rotates clockwise slightly under the inertial load, however, the strut 550 is blocked and prevented from rotating counter-clockwise any further due to the intentional interference established between the abutting shoulder 99 of the armature 560 and the locking edges 98 of the projections 97. Therefore, the interference between the edges 98 of the projections 97 and the shoulders 99 of the armature 560 greatly increase the force required to move the strut 550 against the outer ratchet teeth 544 of the inner race 536, but doesn't increase the amount of load required by the armature 560/coil assembly 552 to pivot the strut 550, as commanded and intended.

It should be appreciated that the projections 97 of the struts 550 and shoulders 99 of the armature 560 could be utilized on other active strut assembly configurations to resist high inertia loading.

Referring now to FIGS. 11-14, a clutch assembly 600 is generally shown to be a modified version applicable to each of bi-directional clutch assemblies 20 (FIGS. 1-3), 120 (FIG. 4), 200 (FIG. 5A), 300 (FIG. 5B), 420 (FIGS. 6-7) and 520 (FIGS. 8-10), and particularly to the controllable one-way clutch associated with each alternative embodiment. In particular, clutch assembly 600 includes a controllable one-way clutch integrating a number of deployment preventing features that are directed to addressing and minimizing/inhibiting the unintended deployment of the active strut as a result of hydraulic effects acting thereon due to fluid within the transmission and/or clutch assembly 600. However, the hydraulic deployment preventing features to be described hereinafter are also applicable to passive one-way clutches for the same purpose and those skilled in the art will recognize the ability to readily integrate these features into any strut-type or rocker-type one-way clutch. Likewise, while each of the above clutch assemblies includes an active strut assembly configured to use an armature to deploy the active struts upon actuation of the electromagnetic actuator, the hydraulic deployment prevention features of the present disclosure are equally applicable to controllable one-way clutches having "direct" strut actuation configurations as well as being equally applicable to other types of moveable locking elements used in place of struts.

Clutch assembly 600 includes an outer race 602 that extends about an axis A. Outer race 602 includes an outer ring segment 604, an inner ring segment 606, and a plate segment 608 therebetween. Lugs 610 formed on outer ring segment 604 are provided for mating with a first component. As noted, the first component can be a stationary transmission housing or a rotary component such as a shaft. Outer ring segment 604 also includes one or more actuator bosses 612 defining an actuator pocket 614, an armature pocket 616, and a strut pocket 618. Finally, inner ring segment 606 includes a plurality of ramped inner ratchet teeth 620 which extend inwardly and are evenly distributed about the A axis.

While only schematically shown, clutch assembly 600 further includes an inner race 624 that also extends about the A axis. The inner race of clutch assembly 600 is understood to be generally similar in structure and function to inner ring 36 of clutch assembly 20. Thus, inner race 624 has an outer rim segment disposed radially between outer and inner ring segments 604, 606 of outer race 602, and an inner rim segment disposed radially inwardly from inner ring segment 606 of outer race 602. The inner rim segment of inner race 624 has inner torque transfer structures (i.e. lugs or splines) for mating engagement with the second component. Finally, the outer rim segment of inner race 624 includes a plurality of ramped outer ratchet teeth that extend radially outwardly and are evenly distributed about the A axis.

A passive one-way clutch (not shown) is associated with clutch assembly 600 and again includes a plurality of passive struts pivotably supported by inner race 624. The passive struts are moveable for engaging inner ratchet teeth 620 on inner ring segment 606 of outer race 602. As before, the passive struts are configured to engage inner ratchet teeth 620 to prevent relative rotation between outer race 602 and inner race 624 in a first (locking) direction while allowing relative rotation therebetween in a second (freewheeling) direction.

The controllable one-way clutch 630, associated with bi-directional clutch assembly 600, includes an active strut assembly 632 received in each actuator boss 612 of outer race 602. Each active strut assembly 632 includes an active strut 634, an armature 636, and an electromagnetic actuator 638. Again, each active strut 634 is pivotably supported in strut pocket 618 for movement between a locked (deployed) and an unlocked (non-deployed) position with respect to the ramped outer ratchet teeth formed on the outer rim segment of inner race 624. In the locked position, an engagement end 634a of active struts 634 has pivoted to a position relative to outer race 602 so as to engage the outer ratchet teeth on inner race 624 to establish the locked clutch mode. In contrast, the engagement end of 634a of active struts 634 is radially displaced and disengaged from the outer ratchet teeth on inner race 624 when located in their unlocked position so as to establish the unlocked clutch mode.

Each armature 636 is pivotably supported in armature pocket 616 of actuator boss 612 and is mechanically connected to a corresponding active strut 634. When armature 636 is located in an attracted position relative to actuator 638, active strut 634 is located in its deployed position. In contrast, location of armature 636 in an unattracted position relative to actuator 638 results in location of active struts 634 in their non-deployed positions. A return spring 640 is retained by outer race 602 and acts on a tail end 634b of each active strut 634 so as to normally bias active strut 634 toward its non-deployed position which, in turn, biases armature 636 toward an unattracted position. Return spring 640 could alternatively act directly on armature 636. Electromagnetic actuator 638 is supported in actuator pocket 614 of actuator boss 612 and has a coil assembly that is radially spaced from armature 636 and strut 634. As before, the coil assembly includes a core of magnetically permeable material, a bobbin surrounding the core, and a coil winding wrapped about the bobbin. As is known, energization of the coil assembly establishes a magnetic attraction between the core and armature 636 which functions to pivotably move armature 636 to its attracted position and strut 634 to its deployed position against the biasing of return spring 640.

In accordance with aspects of the present invention, a number of distinct deployment inhibiting features are associated with at least one of outer race 602, active strut 634 and armature 636. These features are configured to inhibit unintended (i.e. non-energized) deployment of active struts 634 by addressing and counteracting the fluid dynamics and flow characteristics of fluid acting on or around the active strut assemblies 632, cumulatively identified as "hydraulic deployment". Unintended hydraulic deployment is a condition where the strut is moved from its non-deployed position toward its deployed position due to a pressure gradient acting thereon. This pressure gradient, when combined with the fluid dynamics associated with rotation of inner race 624 relative to outer race 602, results in a force vector acting on engagement end 634a of active struts 634. As the hydraulically induced force acting on end 634a of active struts 634 increases, it eventually overcomes the biasing force exerted by return spring 640, thereby resulting in unintended pivotal movement of active struts 634 toward their deployed position while electromagnetic actuator 638 remains non-energized. Thus, clutch assembly 600 acts as an inefficient fluid pump.

One solution to this unwanted pump behavior is to add anti-deployment features which function to either divert or redirect fluid flow from sensitive areas of selectable one-way clutch 630 or to reduce the fluid pressure in other areas, thereby reducing the hydraulic deployment force exerted on active struts 634 generated by fluid movement associated with freewheeling of inner race 624 relative to outer race 602. To this end, several modifications and/or features have been added to the various components of controllable one-way clutch 630. The following description of each feature is in no particular order or relevance or functionality.

In accordance with a first anti-deployment feature, an elongated flow channel 650 is shown formed in plate segment 608 of outer race 602. While flow channel 650 is shown to be aligned along axis A and extend generally symmetrically with respect to a center line of electromagnetic actuator 638, these are merely non-limiting examples used to illustrate one suitable embodiment. Alternatives contemplated include, without limitation, modifying the length of flow channel 650, its symmetry, its depth (constant or variable) and its width. Such variations are all intended to prevent a pressure build or to bleed pressure from the high pressure area to the lower pressure area of clutch 630. Furthermore, this flow channel 650 interferes with fluid travelling radially outwardly toward active strut assembly 632, especially fluid disposed between outer ring segment 604 and inner ring segment 606 of outer race 602.

Figure 14:
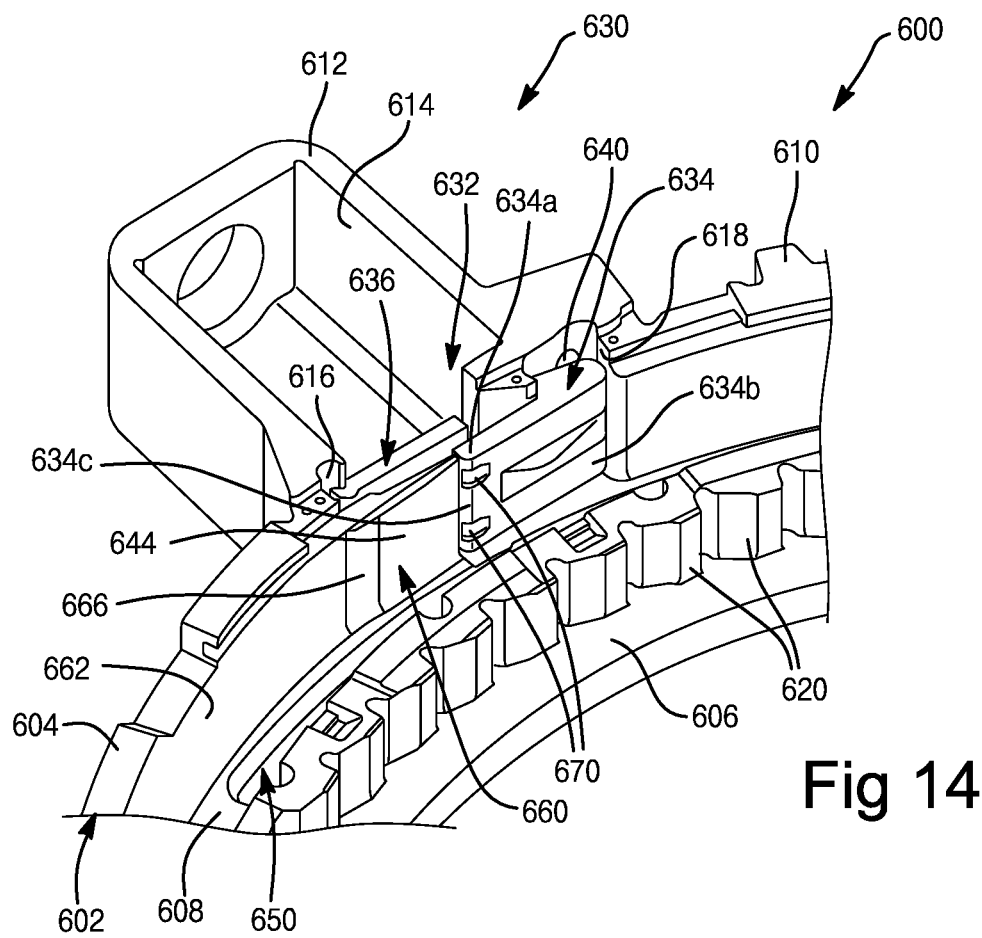
FIG. 14 is an isometric view of the active strut assembly of FIG. 13 showing the combination of all three hydraulic deployment prevention features in greater detail.

In accordance with a second anti-deployment feature, a ramped or flow camming structure 660 is formed on an inner wall surface 662 of outer ring segment 604 of outer race 602. This flow camming structure 660 is best shown in FIG. 14 to include a raised surface segment 664 connected to inner wall surface 662 via a ramped surface segment 666. The length and surface configuration (i.e. arcuate, planar, constant radius or variable) of one or both of raised surface segment 664 and camming surface segment 666 associated with the flow camming structure 660 can be varied. This feature is configured to eliminate a pinch point between inner race 624 and outer race 602 created by a fluid damming effect associated with fluid within and around coil pocket 614 which resulted in localized fluid pressurization near and around active strut 634.

Figure 12:
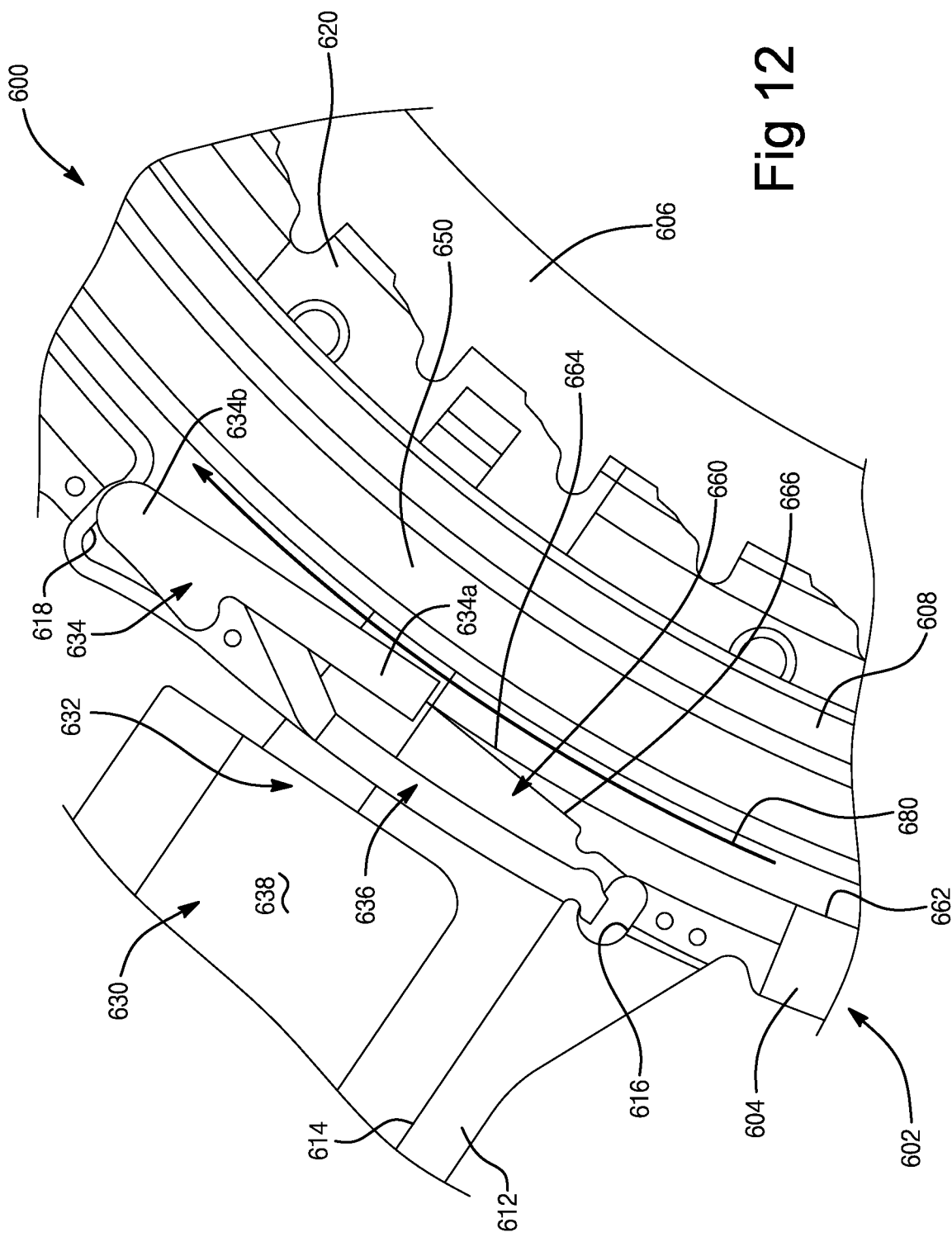
FIG. 12 is an enlarged partial view of FIG. 11 illustrating first and second hydraulic deployment prevention features in greater detail.
Figure 13:
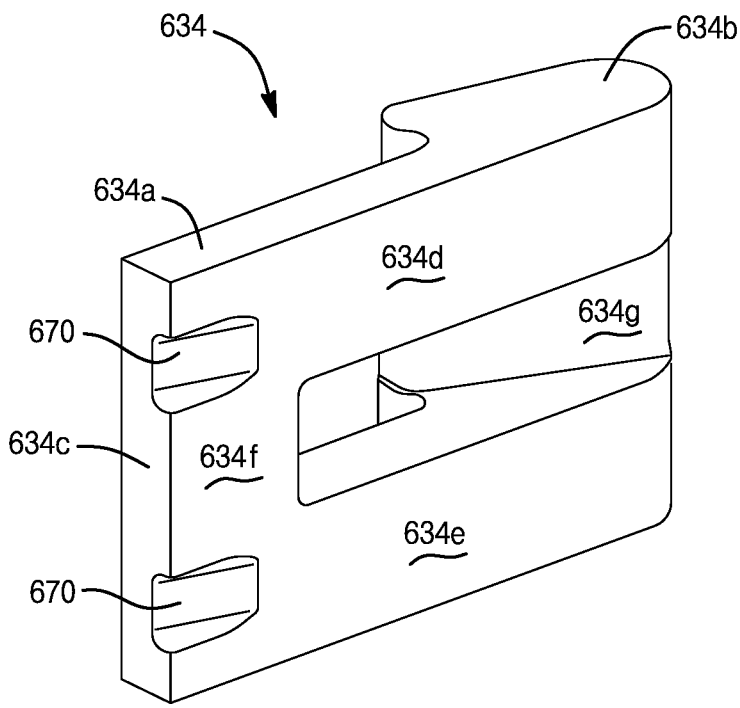
FIG. 13 is an isometric view of the strut associated with the active strut assembly of FIGS. 11 and 12 illustrating a third hydraulic deployment prevention feature in greater detail.

In accordance with a third anti-deployment feature, one or more flow channels, as referred to as spoilers 670, are formed in edge surface 634c on engagement end 634a of active struts 634. Active strut 634 is best shown in FIGS. 13 and 14 to include a pair of leg sections 634d, 634e connected at engagement end 634a via a cross-rail section 634f and at pivot end 634b via a pivot rail section 634g. FIGS. 13 and 14 show a pair of ramped spoilers 670 having a greatest depth at end surface 634c and converging into leg sections 634d, 634e. The length, width, taper, location, number and/or profile of these flow spoilers 670 can be varied to meet any suitable requirements. In particular, spoilers 670 function to force oil over the tip end 634a of active struts 634 to assist in maintaining active struts 634 in their retracted, non-deployed position. These flow channels in active struts 634 function as spoiler in that they generate a radial fluid force to assist strut return spring 640 in holding active struts 634 in the non-deployed position. FIG. 12 includes an elongated arrow 680 showing that the combination of these three (3) anti-deployment features are configured to redirect the oil flow over the tips of the active struts 634 forcing them toward the coil pocket.

The inventive concepts associated with FIGS. 11-14 are critically important to optimize primary performance of these one-way clutches or rocker clutches and are directed to minimizing susceptibility to unintended hydraulic strut deployment.

Figure 15:
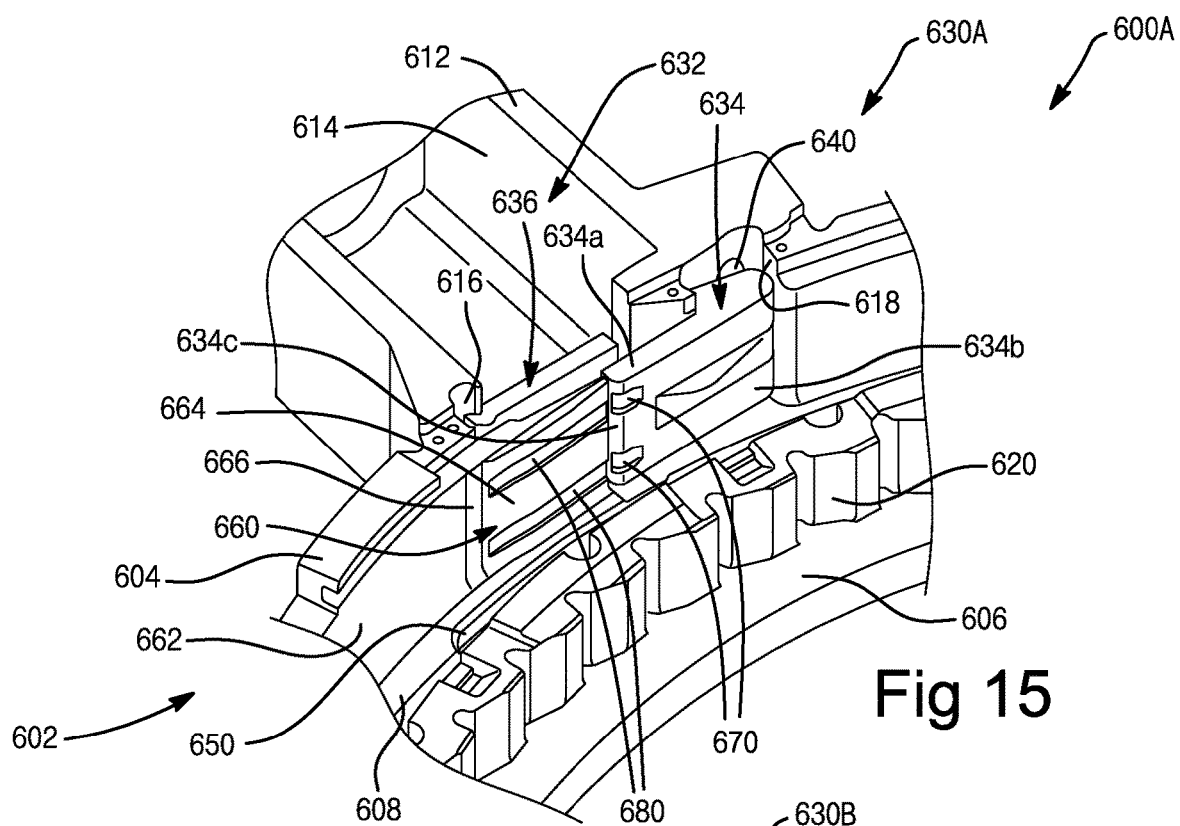
FIG. 15 is another isometric view of the active strut assembly of FIG. 13 showing the three hydraulic deployment prevention features of FIG. 14 now combined with a fourth hydraulic deployment prevention feature.

Referring now to FIG. 15, a clutch assembly 600A is shown to be a slightly modified version of clutch assembly 600 shown in FIGS. 11-14. To this end, clutch assembly 600A includes a controlled one-way clutch 630A integrating a number of deployment preventing features that, as mentioned previously, are directed to minimizing/inhibiting the unintended deployment of the active strut 634 resulting from the hydraulic effects of the fluid acting thereon due to fluid flow within the transmission and/or clutch assembly 600A. Generally speaking, clutch assembly 600A is configured to combine one or more of the three (3) hydraulic anti-deployment features disclosed in association with clutch assembly 600 of FIGS. 11-13 with an additional (hereinafter "fourth") anti-deployment feature. Due to the similarity of most components of clutch assembly 600A to the components detailed previously in association with clutch assembly 600, common reference numerals are used hereinafter to identify the similar components.

The controllable one-way clutch 630A associated with bi-directional clutch assembly 600A includes an active strut assembly 632 received in each actuator boss 612 formed in outer race 602. As before, each active strut assembly 632 includes an active strut 634, an armature 636, and an electromagnetic actuator 638. Each active strut 634 is pivotably supported in strut pocket 618 for movement between its locked (deployed) and unlocked (non-deployed) positions with respect to ramped outer ratchet teeth formed on the outer rim segment of inner race 624. As seen, controllable one-way clutch 630A is shown, in this non-limiting embodiment, to include: (a) the first anti-deployment feature noted above which is configured as elongated flow channel 650 formed in plate segment 608 of outer race 602; (b) the second anti-deployment feature noted above which is configured as ramped camming structure 660 formed on outer ring segment 604 of outer race 602; and (c) the third anti-deployment feature noted above which is configured as a pair of flow channels or "spoilers" 670 formed in edge surface 634c on engagement end 634a of active struts 634. As previously noted, the specific dimensions of each of these anti-deployment features can be modified to meet particular fluid flow and deployment requirements associated with clutch assembly 600A.

In accordance with the fourth anti-deployment feature, FIG. 15 illustrates a pair of elongated flow channels 680 formed in camming structure 660 and which are aligned with spoilers 670 formed in active struts 634. Flow channels 680 are provided to optimize the directed flow of fluid into spoilers 670 so as to increase the force exerted on tip segment 634a of active struts 634 which, in turn, urges active struts 634 toward their non-deployed position. The length, width and depth of flow channels 680 can be varied, as well as the profile (i.e. rectangular or cylindrical) thereof, to provide optimized directed flow of fluid into spoilers 670. While both flow channels 680 are shown to be identical in configuration, the present embodiment contemplates alternative arrangements employing non-identical configurations for flow channels 680.

Figure 16:
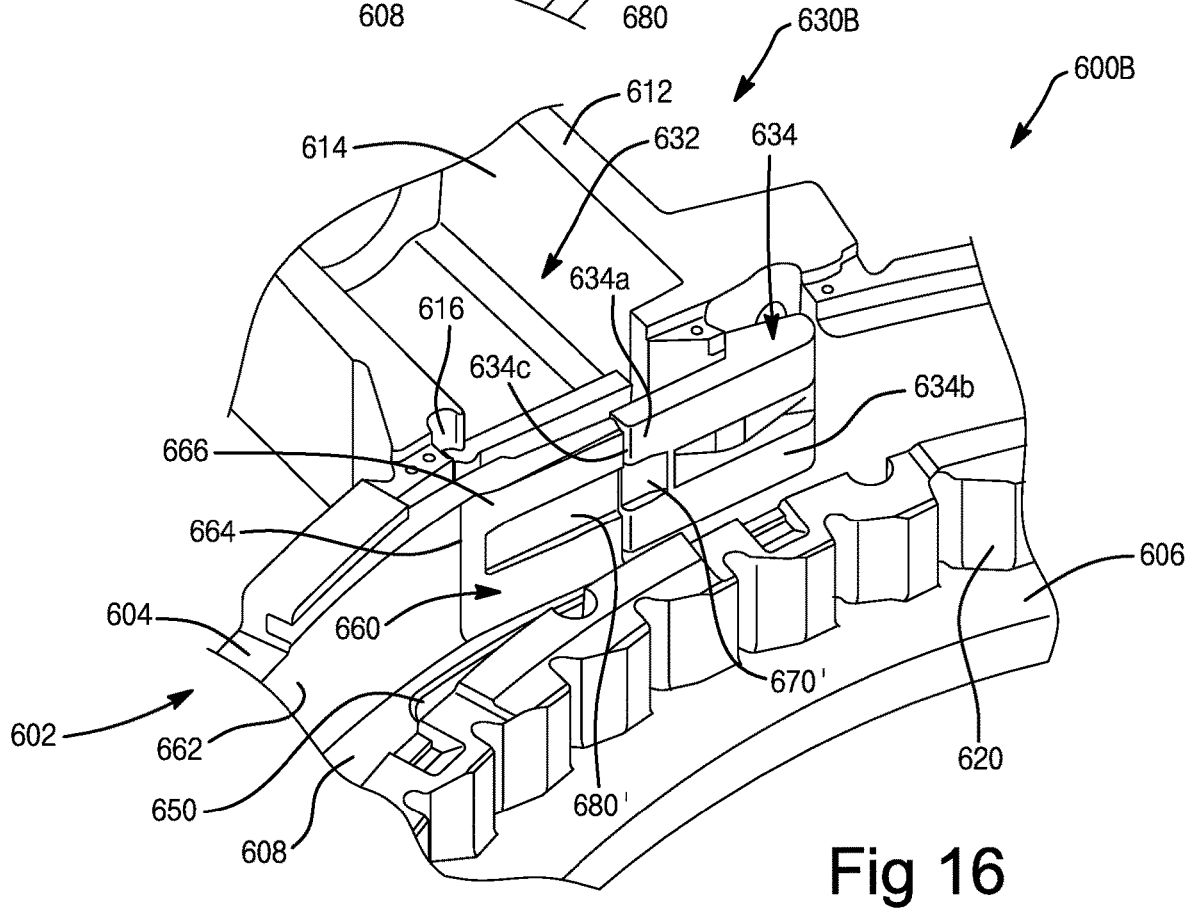
FIG. 16 is yet another isometric view of the active strut assembly of FIG. 13 illustrating an alternative configuration for the fourth hydraulic deployment prevention feature shown in FIG. 15.

FIG. 16 illustrates another version of a bi-directional clutch assembly 600B having a controllable one-way clutch 630B that is generally similar to one-way clutch 630A of bi-directional clutch assembly 600A of FIG. 15, with the exception that a single flow channel 680' is formed in ramped camming structure 660 which is aligned with a single spoiler 670' formed in active strut 634. As before, the use of this fourth anti-deployment feature in cooperation with the second anti-deployment feature (ramped camming structure 660) and the third anti-deployment feature (spoiler 670') promotes enhanced/increased fluid flow specifically directed to end segment 634a of active struts 634 to assist in maintaining active struts 634 in their unlocked/non-deployed position. Note that clutch assembly 600B is also configured to include the first anti-deployment feature comprising flow channel 650.

Again, to reiterate, the hydraulic anti-deployment features disclosed herein find application to both passively and actively-controlled one-way clutches, alone or bundled in bi-directional arrangements. These anti-deployment arrangements are also adaptable to both radially-stacked and axially-aligned versions of such one-way clutches. Finally, these features are applicable with both direct-strut and indirect-strut actuation types of controllable one-way clutches.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A one-way clutch for use in a power transmission device having hydraulic fluid, the one-way clutch comprising:
   a clutch module having a first member and a second member rotatable relative to the first member, the second member having a plurality of ratchet teeth; and
   a strut module having a strut supported by the first member for movement between a first position displaced from engagement with the the ratchet teeth defining a freewheel mode and a second position engaged with at least one of the ratchet teeth defining a locked mode,
   wherein at least one of the first member and the strut has at least one anti-deployment feature configured to assist in holding the strut in its first position during rotation of the second member relative to the first member by counteracting hydraulic forces applied by the hydraulic fluid to the strut;
   wherein the at least one anti-deployment feature includes at least one of a ramp defined along the first member and circumferentially spaced from the strut or a flow channel defined by the first member.

2. The one-way clutch of claim 1, wherein the first member presents a radially inner wall surface, and wherein the at least one anti-deployment feature includes a flow channel defined in the first member at a location between the ratchet teeth on the second member and the strut, and located radially inwardly of the radially inner wall surface of the first member.

3. The one-way clutch of claim 1, wherein the anti-deployment feature further includes at least one flow channel formed at an edge surface of the strut.

4. The one-way clutch of claim 1, wherein the first member presents a radially inner wall surface, and wherein the anti-deployment feature is a ramp formed on the radially inner wall surface and configured to direct the hydraulic fluid to act on the strut so as to forcibly urge the strut towards its first position.

5. The one-way clutch of claim 1, wherein the anti-deployment feature includes a first anti-deployment feature and a second anti-deployment feature cooperating to direct the hydraulic fluid to flow over the strut and urge the strut toward its first position.

6. The one-way clutch of claim 5, wherein the first member presents a radially inner wall surface, and wherein the first anti-deployment feature is a flow channel formed in the first member at a location between the ratchet teeth on the second member and the strut, and located radially inwardly of the radially inner wall surface of the first member, and wherein the second anti-deployment feature is a ramp formed on the radially inner wall surface and configured to direct hydraulic fluid to act on an end portion of the strut.

7. The one-way clutch of claim 6, wherein the anti-deployment feature further includes a third anti-deployment feature cooperating with the second anti-deployment feature to direct fluid to act on the end portion of the strut.

8. The one-way clutch of claim 7, wherein the third anti-deployment feature is configured to include at least one flow channel formed in the end portion of the strut.

9. The one-way clutch of claim 8 wherein the anti-deployment feature includes a fourth anti-deployment feature cooperating with the third anti-deployment feature.

10. The one-way clutch of claim 9, wherein the fourth anti-deployment feature is configured to include at least one flow channel formed in the ramp on the first member and which is arranged to direct fluid to the at least one flow channel formed in the end portion of the strut.

11. The one-way clutch of claim 10, wherein a pair of the flow channels are formed in the first member and are aligned with a pair of the flow channels formed in the end portion of the strut.

12. A one-way clutch for use in a power transmission device having a stationary component, a rotary component, and hydraulic fluid, the one-way clutch comprising:
   a clutch module having a first clutch member fixed to the stationary component and a second clutch member fixed to the rotary component for rotation relative to the first clutch member, the second clutch member formed to include ratchet teeth; and
   an actuation module having a strut supported on the first clutch member for pivotal movement between a first position whereat an engagement end portion of the strut is displaced from engagement with the ratchet teeth to define a clutch freewheel mode and a second position whereat the engagement with the engagement end portion of the strut is lockingly engaged with one of the ratchet teeth to define a clutch locked mode, and a strut biasing spring operable to bias the strut toward its first position,
   wherein at least one of the first clutch member and the strut includes an anti-deployment feature configured to assist the strut biasing spring in locating the strut in its first position during rotation of the second clutch member relative to the first clutch member by directing a flow of the hydraulic fluid so as to counteract hydraulic forces applied to the strut by the hydraulic fluid,
   wherein the at least one anti-deployment feature includes at least one of a ramp defined along the first clutch member and circumferentially spaced from the strut, a flow channel defined by the first clutch member, or a flow channel defined in the strut for diverting hydraulic fluid to urge the strut toward its first position.

13. The one-way clutch of claim 12, wherein the actuation module further includes a power-operated actuator for selectively moving the strut from its first position to its second position in opposition to the biasing of the strut biasing spring.

14. The one-way clutch of claim 12, wherein the anti-deployment feature is at least one of a flow channel formed in the first clutch member and located between the ratchet teeth on the second clutch member and the engagement end portion of the strut, and a flow channel in the engagement end portion of the strut.

15. The one-way clutch of claim 14, wherein the anti-deployment feature further includes a flow channel formed in the ramp on the first clutch member and which is aligned with the flow channel formed in the engagement end portion of the strut.

16. The one-way clutch of claim 15, wherein the hydraulic fluid flows in the flow channel formed in the ramp and is directed into the flow channel formed in the engagement end of the strut to hold the strut in its first position.

17. A one-way clutch assembly, comprising: an outer race having a strut pocket and an actuator pocket; an inner race arranged to rotate relative to the outer race and having ratchet teeth; a strut supported in the strut pocket of the outer race for pivotal movement between a non-deployed position whereat an engagement end portion of the strut is displaced from the ratchet teeth and a deployed position whereat the engagement end portion of the strut is lockingly engaged with one of the ratchet teeth, the strut being biased toward its non-deployed position; and a power-operated actuator retained in the actuator pocket of the outer race and operable for causing the strut to move from its non-deployed position into its deployed position, wherein at least one of the outer race and the strut includes a fluid diverting anti-deployment feature configured to divert the hydraulic fluid disposed between the outer race and the inner race to flow over the engagement end portion of the strut and apply a hydraulic force on the strut for assisting in holding the strut in its non-deployed position; wherein the at least one anti-deployment feature includes a flow channel defined in the strut for diverting hydraulic fluid to urge the strut toward its first position.

* * * * *